United States Patent
Huang et al.

(10) Patent No.: US 10,484,866 B2
(45) Date of Patent: Nov. 19, 2019

(54) DEVICE-TO-DEVICE IDENTIFICATION CONFLICT SOLUTION METHOD AND DEVICE-TO-DEVICE USER EQUIPMENT

(71) Applicant: ZTE Corporation, Shenzhen (CN)

(72) Inventors: Ying Huang, Shenzhen (CN); Lin Chen, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 15/752,219

(22) PCT Filed: Jun. 8, 2016

(86) PCT No.: PCT/CN2016/085302
§ 371 (c)(1),
(2) Date: Feb. 12, 2018

(87) PCT Pub. No.: WO2017/028610
PCT Pub. Date: Feb. 23, 2017

(65) Prior Publication Data
US 2019/0007827 A1    Jan. 3, 2019

(30) Foreign Application Priority Data
Aug. 14, 2015    (CN) .......................... 2015 1 0502023

(51) Int. Cl.
*H04W 8/22*    (2009.01)
*H04W 4/00*    (2018.01)
(Continued)

(52) U.S. Cl.
CPC ............... *H04W 8/22* (2013.01); *H04W 4/00* (2013.01); *H04W 8/005* (2013.01); *H04W 92/18* (2013.01)

(58) Field of Classification Search
CPC ......... H04W 8/22; H04W 4/00; H04W 8/005; H04W 92/18
See application file for complete search history.

(56) References Cited

U.S. PATENT DOCUMENTS

| 2013/0089023 A1 | 4/2013 | Shin |
| 2013/0308551 A1 | 11/2013 | Madan |

(Continued)

FOREIGN PATENT DOCUMENTS

| CN | 1581808 A | 2/2005 |
| CN | 103428789 A | 12/2013 |

(Continued)

OTHER PUBLICATIONS

English Translation of International Search Report in international application No. PCT/CN2016/085302, dated Sep. 18, 2016.

(Continued)

*Primary Examiner* — Ajay Cattungal
(74) *Attorney, Agent, or Firm* — Cantor Colburn LLP

(57) ABSTRACT

Published are a device-to-device identification conflict solution method and a D2D UE. The method comprises: a first D2D UE determining whether a terminal identification of the first D2D UE has a conflict with a terminal identification of another D2D UE or a D2D group identification; when the terminal identification of the first D2D UE has a conflict with the terminal identification of the other D2D UE or the D2D group identification, reallocating a terminal identification to the first D2D UE; and sending the terminal identification reallocated to the first D2D UE to a second D2D UE, wherein the second D2D UE is a D2D UE adjacent to the first D2D UE, or a D2D UE which has established a PC5 connection with the first D2D UE.

12 Claims, 14 Drawing Sheets

(51) Int. Cl.
*H04W 8/00* (2009.01)
*H04W 92/18* (2009.01)

(56) References Cited

U.S. PATENT DOCUMENTS

| | | | | |
|---|---|---|---|---|
| 2014/0335853 | A1* | 11/2014 | Sartori | H04W 56/0015 455/426.1 |
| 2015/0142986 | A1* | 5/2015 | Reznik | H04L 67/16 709/228 |
| 2015/0148049 | A1 | 5/2015 | Alberth, Jr. et al. | |
| 2016/0212108 | A1* | 7/2016 | Stojanovski | H04L 63/061 |
| 2017/0317740 | A1* | 11/2017 | Basu Mallick | H04B 7/15557 |

FOREIGN PATENT DOCUMENTS

| | | |
|---|---|---|
| CN | 103686740 A | 3/2014 |
| WO | 2013177179 A1 | 11/2013 |
| WO | 2015077405 A1 | 5/2015 |

OTHER PUBLICATIONS

English Translation of the Written Opinion of the International Search Authority in international application No. PCT/CN2016/085302, dated Sep. 18, 2016.

Intel. "On ProSe UE ID and ProSe Layer-2 Group ID format (preventing future backwards compatibility issues)", SA WG2 Meeting #108 S2-151051, Apr. 7, 2015 (Apr. 4, 2015), section 1, lines 9-14 and 23-25.

3rd Generation Partnership Project. "3rd Generation Partnership Project; Technical Specification Group Services and System Aspects; Study on extended architecture support for proximity-based services (Release 13)", 3GPP TR 23.713 V1.5.0 (Jul. 2015), Jul. 28, 2015 (Jul. 28, 2015), section 7.1.1.1.

Ericsson. "ProSe Group Priorities in Rel-12", 3GPP TSG-RAN WG3 #86 R3-142915, Nov. 8, 2014 (Aug. 11, 2014), the whole document.

Supplementary European Search Report in European application No. 16836474.3, dated May 2, 2018.

\* cited by examiner

DEVICE-TO-DEVICE IDENTIFICATION CONFLICT SOLUTION METHOD AND DEVICE-TO-DEVICE USER EQUIPMENT

TECHNICAL FIELD

The application relates to, but not limited to, a wireless communication technology, and particularly to a Device-to-Device (D2D) Identifier (ID) conflict resolution method and D2D User Equipment (UE).

BACKGROUND

Along with development of wireless multimedia services, requirements of people on high data rate and user experiences increasingly grow, so that higher requirements on system capacity and coverage of a conventional cellular network are made. On the other hand, requirements of people on knowing about and communicating with interested persons or things nearby (i.e., Proximity-based Service (ProSe)) gradually increase along with prevailing of applications such as a social network, short-distance data sharing and local advertising. A conventional cell-based cellular network has obvious limitations in terms of support to high data rate and ProSe, and under such a requirement background, a D2D technology representative of a new direction of future development of communication technologies emerges. Application of a D2D technology may reduce a burden of a cellular network, reduce battery power consumption of UE, increase data rate, improve robustness of a network infrastructure and well meet the abovementioned requirements on a high-data rate service and ProSe.

A D2D technology may work in a licensed frequency band or an unlicensed frequency band, and allows direct discovery/direct communication of multiple pieces of UE supporting a D2D function (i.e., D2D UE) with a network infrastructure or without a network infrastructure. There are mainly three D2D application scenarios:

1) D2D UE1 and D2D UE2 perform data interaction under coverage of a cellular network, and user plane data does not pass through a network infrastructure, as shown in mode 1 in FIG 1;

2) UE in a weakly-covered/uncovered area performs relay transmission, as shown in mode 2 in FIG. 1, and D2D UE4 with relatively poor signal quality is allowed to communicate with the network through D2D UE3 covered by the network nearby, which may help an operating company to extend coverage and improve capacity; and 3) direct communication among equipment is allowed under the condition that the cellular network may not work normally in case of an earthquake or emergency, as shown in mode 3 in FIG. 1, and a control plane and user plane among D2D UE5, D2D UE6 and D2D UE7 may perform one-hop or multi-hop data communication without any network infrastructure.

A D2D technology usually includes a D2D discovery technology and a D2D communication technology: the D2D discovery technology refers to a technology arranged to judge/determine proximity between two or more pieces of D2D UE (for example, within a range where D2D direct communication may be performed) or arranged to judge/determine that first D2D UE is proximal to second D2D UE; and the D2D communication technology refers to a technology capable of implementing direct communication of part or all communication data between D2D UE without any network infrastructure.

D2D UE communication in a D2D communication group may adopt a one-to-many multicast communication manner, and in such a manner, all D2D UE in the group may receive data sent from a certain D2D UE in the group. While in the scenarios 2) and 3), D2D UE may serve as a relay node, then remote D2D UE on an edge of coverage of a cellular network or outside the coverage may perform cellular communication with the network through the relay D2D UE, and D2D communication may be performed between D2D UE through the relay D2D UE. In such a scenario, the remote D2D UE and the relay D2D UE communicate by adopting a one-to-one D2D communication manner. A Media Access Control Protocol Data Unit (MAC PDU) header of a D2D communication data packet includes source and target ID fields. For a D2D communication group, a content of the target ID field in the MAC PDU header is a D2D group ID (ProSe Layer-2 Group ID), and the D2D group ID is 24-bit, and is allocated by a Direct Provisioning Function (DPF) (a component of a ProSe function). While for one-to-one D2D communication, the content of the target ID field in the MAC PDU header is a terminal ID (ProSe terminal ID) of target D2D UE, and the terminal ID is also 24-bit, and may be preconfigured in Mobile Equipment (ME) or a Universal Integrated Circuit Card (UICC), or is arranged to the D2D UE by the ProSe function, or is allocated by the D2D UE itself, with its global uniqueness not ensured. During D2D communication, one-to-one unicast communication and one-to-many multicast communication may exist at the same time, there may exist the condition that a ProSe terminal ID of D2D UE for one-to-one unicast communication is the same as a ProSe terminal ID of another D2D UE for one-to-one unicast communication or the ProSe terminal ID of the D2D UE for one-to-one unicast communication is the same as a D2D group ID (ProSe Layer-2 Group ID) for one-to-many multicast communication, and then the D2D UE and all D2D UE in a D2D communication group with the same ID may all receive a unicast or multicast MAC PDU data packet with the same ID. For example, D2D UE 2 and D2D UE 3 in FIG. 2 belong to the same D2D communication group and may perform D2D group communication, D2D UE 1 does not belong to the D2D communication group, but the D2D UE 1 may perform one-to-one D2D discovery/communication with the D2D UE 2 or the D2D UE 3. There is made such a hypothesis that a unicast ProSe terminal ID of the D2D UE 1 is the same as a ProSe Layer-2 Group ID of a ProSe communication group, and then the D2D UE 1 and D2D UE (including the D2D UE 2 and the D2D UE 3) of the D2D communication group may all receive a MAC PDU with the same ID. There is yet no method capable of solving such a D2D ID conflict problem in a related technology.

SUMMARY

The below is a summary about a subject described in the disclosure in detail. The summary is not intended to limit the scope of protection of the claims.

Embodiments of the disclosure provide a D2D ID conflict resolution method and D2D UE.

A D2D ID conflict resolution method provided by an embodiment of the disclosure may be applied to first D2D UE, and the method may include the following actions.

Whether a terminal ID of the first D2D UE conflicts with a terminal ID or a D2D group ID of another D2D UE is judged.

When the terminal ID of the first D2D UE conflicts with the terminal ID or the D2D group ID of the other D2D UE, a terminal ID is reallocated to the first D2D UE.

The reallocated terminal ID of the first D2D UE is sent to second D2D UE, where the second D2D UE is a D2D UE in proximity to the first D2D UE or is a D2D UE which has established a PC5 connection with the first D2D UE.

In the embodiment of the disclosure, the action of judging whether the terminal ID of the first D2D UE conflicts with the terminal ID or the D2D group ID of the other D2D UE, may include the following actions.

When a received data packet fails to be parsed, it is determined that the terminal ID of the first D2D UE conflicts with the terminal ID or the D2D group ID of the other D2D UE.

Alternatively, upon reception of ID conflict indication information sent from third D2D UE, it is determined that the terminal ID of the first D2D UE conflicts with the terminal ID or the D2D group ID of the other D2D UE, where the ID conflict indication information is arranged to indicate that the terminal ID of the first D2D UE conflicts with the terminal ID or the D2D group ID of the other D2D UE.

In the embodiment of the disclosure, the condition that the received data packet fails to be parsed may include the following cases.

A Packet Data Convergence Protocol (PDCP) layer of the first D2D UE fails to decrypt the received data packet.

Alternatively, the first D2D UE determines that a target Internet Protocol (IP) address of the received data packet is inconsistent with an IP address of the first D2D UE.

Alternatively, an application layer of the first D2D UE determines that the received data packet has an error.

In the embodiment of the disclosure, the action of receiving the ID conflict indication information sent from the third D2D UE, may include the following actions.

The ID conflict indication information sent from the third D2D UE is received through a MAC Control Element (CE) of a unicast D2D communication physical channel.

Alternatively, the ID conflict indication information sent from the third D2D UE is received through a PC5 interface signaling.

Alternatively, the ID conflict indication information sent from the third D2D UE is received through a unicast D2D communication data packet.

Alternatively, the ID conflict indication information sent from the third D2D UE is received through a D2D discovery message.

In the embodiment of the disclosure, before the ID conflict indication information sent from the third D2D UE is received, the third D2D UE may detect that the terminal ID of the first D2D UE conflicts with the terminal ID or the D2D group of the other D2D UE.

In the embodiment of the disclosure, the action of detecting, by the third D2D UE, that the terminal ID of the first D2D UE conflicts with the terminal ID or D2D group ID of the other D2D UE, may include the following actions.

The third D2D UE detects that the terminal ID of the first D2D UE is the same as the terminal ID or the D2D group ID of the other D2D UE through a received D2D discovery message sent from the first D2D UE.

Alternatively, the third D2D UE detects that the terminal ID of the first D2D UE is the same as the terminal ID or D2D group ID of the other D2D UE through received PC5 interface signaling sent from the first D2D UE.

Alternatively, the third D2D UE detects that the terminal ID of the first D2D UE is the same as the terminal ID or D2D group ID of the other D2D UE through a MAC PDU of a received data packet sent from the first D2D UE.

In the embodiment of the disclosure, the first D2D UE may be remote D2D UE or relay D2D UE or a D2D UE; the second D2D UE may be remote D2D UE or relay D2D UE or a D2D UE; and the third D2D UE may be remote D2D UE or relay D2D UE or a D2D UE.

In the embodiment of the disclosure, the action of sending the reallocated terminal ID of the first D2D UE to the second D2D UE may include the following actions.

At least one of an old terminal ID, the reallocated terminal ID, a connection release indication or an ID change indication of the first D2D UE is sent to the second D2D UE through a D2D discovery message.

Alternatively, at least one of the old terminal ID, the reallocated terminal ID, the connection release indication or the ID change indication of the first D2D UE is sent to the second D2D UE through a D2D communication MAC CE.

Alternatively, at least one of the old terminal ID, the reallocated terminal ID, the connection release indication or the ID change indication of the first D2D UE is sent to the second D2D UE through PC5 interface signaling.

Alternatively, at least one of the old terminal ID, reallocated terminal ID, the connection release indication or the ID change indication of the first D2D UE is sent to the second D2D UE through a D2D communication data packet.

In the embodiment of the disclosure, after the action of reallocating the terminal ID to the first D2D UE, the method may further include the following actions.

The reallocated terminal ID of the first D2D UE is sent to a base station which, upon reception of the reallocated terminal ID of the first D2D UE, stores the reallocated terminal ID and updates the reallocated terminal into context information of the first D2D UE.

In the embodiment of the disclosure, upon reception of the reallocated terminal ID of the first D2D UE, the second D2D UE may start using the reallocated terminal ID of the first D2D UE as a target ID for sending D2D data to the first D2D UE.

Correspondingly, the method may further include the following actions. Upon reception of a data packet, sent from the second D2D UE, with the reallocated terminal ID of the first D2D UE as the target ID, the reallocated terminal ID of the first D2D UE is started to be used as a source ID for sending D2D data to the second D2D UE.

Alternatively, upon reception of the reallocated terminal ID of the first D2D UE, the second D2D UE may send terminal ID reception confirmation information to the first D2D UE through a D2D communication data packet.

Correspondingly, the method may further include the following actions. Upon reception of the terminal ID reception confirmation information sent from the second D2D UE, the reallocated terminal ID of the first D2D UE is started to be used as the source ID for sending the D2D data to the second D2D UE.

In the embodiment of the disclosure, upon reception of at least one of the connection release indication or ID change indication sent from the first D2D UE, the second D2D UE may release the PC5 connection with the first D2D UE.

In the embodiment of the disclosure, after the action of sending the reallocated terminal ID of the first D2D UE to the second D2D UE, the method may further include the following actions.

The first D2D UE and the second D2D UE start using the reallocated terminal ID for data transmission after a current modification period, where the second D2D UE is a D2D UE which has established the PC5 connection with the first D2D UE and the modification period is configured by the base station or a ProSe server or a network element of a core network.

A D2D ID conflict resolution method provided by another embodiment of the disclosure may be applied to fourth D2D UE, and the method may include the following actions.

Whether a terminal ID of the fourth D2D UE conflicts with a terms al ID or a D2D group ID of another D2D UE is judged.

When the terminal ID of the fourth D2D UE conflicts with the terminal ID or the D2D group ID of the other D2D UE, ID conflict indication information is sent to fifth D2D UE, thereby causing the fifth D2D UE to reallocate a terminal ID to the fourth D2D UE.

The terminal ID sent from the fifth D2D UE and reallocated to the fourth D2D UE is received.

In the embodiment of the disclosure, the action of judging whether the terminal ID of the fourth D2D UE conflicts with the terminal ID or the D2D group ID of the other D2D UE, may include the following actions.

When a received data packet fails to be parsed, it is determined that the terminal ID of the fourth D2D UE conflicts with the terminal ID or the D2D group ID of the other D2D UE.

Alternatively, when the ID conflict indication information sent from sixth D2D UE is received, it is determined that the terminal ID of the fourth D2D UE conflicts with the terminal ID or D2D group ID of the other D2D UE, where the ID conflict indication information is arranged to indicate that the terminal ID of the fourth D2D UE conflicts with the terminal ID or the D2D group ID of the other D2D UE.

In the embodiment of the disclosure, the action of receiving the ID conflict indication information sent from the sixth D2D UE, may include the following actions.

The ID conflict indication information sent from the sixth D2D UE is received through a unicast D2D communication MAC CE.

Alternatively, the ID conflict indication information sent from the sixth D2D UE is received through a PC5 interface signaling.

Alternatively, the ID conflict indication information sent from the sixth D2D UE is received through a unicast D2D communication data packet.

Alternatively, the ID conflict indication information sent from the sixth D2D UE is received through a D2D discovery message.

In the embodiment of the disclosure, before the ID conflict indication information sent from the sixth D2D UE is received, the sixth D2D UE may detect that the terminal ID of the fourth D2D UE conflicts with the terminal ID or D2D group ID of the other D2D UE.

In the embodiment of the disclosure, the action of detecting, by the sixth D2D UE, that the terminal ID of the fourth D2D UE conflicts with the terminal ID or the D2D group ID of the other D2D UE, may include the following actions.

The sixth D2D UE detects that the terminal ID of the fourth D2D UE is the same as the terminal ID or D2D group ID of the other D2D UE through a received D2D discovery message sent from the fourth D2D UE.

Alternatively, the sixth D2D UE detects that the terminal ID of the fourth D2D UE is the same as the terminal ID or D2D group ID of the other D2D UE through received PC5 interface signaling sent from the fourth D2D UE.

Alternatively, the sixth D2D UE detects that the terminal ID of the fourth D2D UE is the same as the terminal ID or D2D group ID of the other D2D UE through a MAC PDU of a received data packet sent from the fourth D2D UE.

In the embodiment of the disclosure, the action of sending the ID conflict indication information to the fifth D2D UE may include the following actions.

An ID conflict indication is sent to the fifth D2D UE through a unicast D2D communication MAC CE.

Alternatively, the ID conflict indication is sent to the fifth D2D UE through PC5 interface signaling.

Alternatively, the ID conflict indication is sent to the fifth D2D UE through a unicast D2D communication data packet.

Alternatively, the ID conflict indication is sent to the fifth D2D UE through a D2D discovery message.

In the embodiment of the disclosure, the action of receiving the terminal ID sent from the fifth D2D UE and reallocated to the fourth D2D UE, may include the following actions.

The terminal ID sent from the fifth D2D UE and reallocated to the fourth D2D UE is received through a unicast D2D communication MAC CE.

Alternatively, the terminal ID sent from the fifth D2D UE and reallocated to the fourth D2D UE is received through PC5 interface signaling.

Alternatively, the terminal ID sent from the fifth D2D UE and reallocated to the fourth D2D UE is received through a unicast D2D communication data packet.

Alternatively, the terminal ID sent from the fifth D2D UE and reallocated to the fourth D2D UE is received through a D2D discovery message.

In the embodiment of the disclosure, after the action of receiving the terminal ID sent from the fifth D2D UE and reallocated to the fourth D2D UE, the method may further include the following actions.

The reallocated terminal ID of the fourth D2D UE is sent to a D2D UE in proximity to the fourth D2D UE or to a D2D UE which has established a connection with the fourth D2D UE.

In the embodiment of the disclosure, after the action of receiving the terminal ID sent from the fifth D2D UE and reallocated to the fourth D2D UE, the method may further include the following actions.

The reallocated terminal ID of the fourth D2D UE is sent to a base station which, upon reception of the reallocated terminal ID of the fourth D2D UE, stores the reallocated terminal ID and updates the reallocated into context information of the fourth D2D UE.

In the embodiment of the disclosure, the fourth D2D UE may be a remote D2D UE, and the fifth D2D UE may be a relay D2D UE.

D2D UE provided by an embodiment of the disclosure may include a first judgment unit, a first allocation unit and a first sending unit.

The first judgment unit is arranged to judge whether a terminal ID of the D2D UE conflicts with a terminal ID or a D2D group ID of another D2D UE.

The first allocation unit is arranged to, when the terminal ID of the D2D UE conflicts with the terminal ID or the D2D group ID of the other D2D UE, reallocate a terminal ID to the D2D UE.

The first sending unit is arranged to send the reallocated terminal ID of the D2D UE to second D2D UE, where the second D2D UE is a D2D UE in proximity to the D2D UE or is a D2D UE which has established a PC5 connection with the D2D UE.

In the embodiment of the disclosure, the first judgment unit include a first parsing subunit or a first receiving subunit.

The first parsing subunit is arranged to, when a received data packet fails to be parsed, determine that the terminal ID of the D2D UE conflicts with the terminal ID or the D2D group ID of the other D2D UE.

The first receiving subunit is arranged to, upon reception of ID conflict indication information sent from third D2D UE, determine that the terminal ID of the D2D UE conflicts with the terminal ID or the D2D group ID of the other D2D UE, where the ID conflict indication information is arranged to indicate that the terminal ID of the D2D UE, conflicts with the terminal ID or the D2D group ID of the other D2D UE.

In the embodiment of the disclosure, the first parsing subunit may be arranged to determine that the received data packet fails to be parsed, when a PDCP layer of the D2D UE fails to decrypt the received data packet; or, when the D2D UE judges that a target IP address of the received data packet is inconsistent with an IP address of the D2D UE; or, when an application layer of the D2D UE judges that the received data packet has an error.

In the embodiment of the disclosure, the first receiving subunit may be arranged to receive the ID conflict indication information sent from the third D2D UE through a MAC CE of a unicast D2D communication physical channel; or, receive the ID conflict indication information sent from the third D2D UE, through a PC5 interface signaling; or, receive the ID conflict indication information sent from the third D2D UE through a unicast D2D communication data packet; or, receive the ID conflict indication information sent from the third D2D UE through a D2D discovery message.

In the embodiment of the disclosure, the D2D UE may be a remote D2D UE or a relay D2D UE or a D2D UE; the second D2D UE may be a remote D2D UE or a relay D2D UE or a D2D UE; and the third D2D UE may be a remote D2D UE or a relay D2D UE or a D2D UE.

In the embodiment of the disclosure, the first sending unit may be arranged to send at least one of an old terminal ID, the reallocated terminal ID, a connection release indication or an ID change indication of the D2D UE to the second D2D UE through a D2D discovery message, or, send at least one of the old terminal ID, the reallocated terminal ID, the connection release indication or the ID change indication of the D2D UE to the second D2D UE through a D2D communication MAC CE, or, send the old terminal ID, reallocated terminal ID, the connection release indication or the ID change indication of the D2D UE to the second D2D UE through a PC5 interface signaling, or, send at least one of the old terminal ID, the reallocated terminal ID, the connection release indication or the ID change indication of the D2D UE to the second D2D UE through a D2D communication data packet.

In the embodiment of the disclosure, the D2D UE may further include a second sending unit.

The second sending unit is arranged to send the reallocated terminal ID of the D2D UE to a base station which, upon reception of the reallocated terminal ID of the first D2D UE, stores the reallocated terminal ID and updates the reallocated terminal ID into context information of the D2D UE.

In the embodiment of the disclosure, upon reception of the reallocated terminal ID of the D2D UE, the second D2D UE may start using the reallocated terminal ID of the D2D UE as a target ID for sending D2D data to the D2D UE.

Correspondingly, the D2D UE may further include a first receiving unit and a third sending unit.

The first receiving unit is arranged to receive a data packet using the reallocated terminal ID of the D2D UE as the target ID from the second D2D UE.

The third sending unit is arranged to use the reallocated terminal ID of the D2D UE as a source ID for sending D2D data to the second D2D UE.

Alternatively, upon reception of the reallocated terminal ID of the D2D UE, the second D2D UE may send terminal ID reception confirmation information to the D2D UE through a D2D communication data packet.

Correspondingly, the D2D UE may further include a second receiving unit and a fourth sending unit.

The second receiving unit is arranged to receive terminal ID confirmation information sent from the second D2D UE.

The fourth sending unit is arranged to use the reallocated terminal ID of the D2D UE as the source ID for sending the D2D data to the second D2D UE.

D2D UE provided by another embodiment of the disclosure may include a second judgment unit, a fifth sending unit and a third receiving unit.

The second judgment unit is arranged to judge whether a terminal ID of the D2D UE conflicts with a terminal ID or D2D group ID of another D2D UE.

The fifth sending unit is arranged to, when the terminal ID of the D2D UE conflicts with the terminal ID or D2D group ID of the other D2D UE, send ID conflict indication information to fifth D2D UE, thereby causing the fifth D2D UE to reallocate a terminal ID to the D2D UE.

The third receiving unit is arranged to receive the terminal ID sent from the fifth D2D UE and reallocated to the D2D UE.

In the embodiment of the disclosure, the second judgment unit may include a second parsing subunit or a second receiving subunit.

The second parsing subunit is arranged to, when a received data packet fails to be parsed, determine that the terminal ID of the D2D UE, conflicts with the terminal ID or D2D group ID of the other D2D UE.

The second receiving subunit is arranged to, when the ID conflict indication information sent from sixth D2D UE is received, determine that the terminal ID of the D2D UE conflicts with the terminal ID or D2D group ID of the other D2D UE, the ID conflict indication information being arranged to indicate that the terminal ID of the D2D UE conflicts with the terminal ID or D2D group ID of the other D2D UE.

In the embodiment of the disclosure, the second receiving subunit may be arranged to receive the ID conflict indication information sent from the sixth D2D UE through a unicast D2D communication MAC CE, or, receive the ID conflict indication information sent from the sixth D2D UE through a PC5 interface signaling, or, receive the ID conflict indication information sent from the sixth D2D UE through a unicast D2D communication data packet, or, receive the ID conflict indication information sent from the sixth D2D UE through a D2D discovery message.

In the embodiment of the disclosure, the fifth sending unit may be arranged to send an ID conflict indication to the fifth D2D UE through a unicast D2D communication MAC CE, or, send the ID conflict indication to the fifth D2D UE through a PC5 interface signaling, or, send the ID conflict indication to the fifth D2D UE through a unicast D2D communication data packet, or, send the ID conflict indication to the fifth D2D UE through a D2D discovery message.

In the embodiment of the disclosure, the third receiving unit may be arranged to receive the terminal ID sent from the fifth D2D UE and reallocated to the D2D UE through a unicast D2D communication MAC CE, receive the terminal ID sent from the fifth D2D UE and reallocated to the D2D UE through PC5 interface signaling, or, receive the terminal ID sent from the fifth D2D UE and reallocated to the D2D UE through a unicast D2D communication data packet, or, receive the terminal ID sent from the fifth D2D UE and reallocated to the D2D UE through a D2D discovery message.

In the embodiment of the disclosure, the D2D UE may further include a sixth sending unit.

The sixth sending unit is arranged to send the reallocated terminal ID of the D2D UE to a D2D UE in proximity to the D2D UE or a D2D UE which has established a connection with the D2D UE.

In the embodiment of the disclosure, the D2D UE may further include a seventh sending unit.

The seventh sending unit is arranged to send the reallocated terminal ID of the D2D UE to a base station which, upon reception of the reallocated terminal ID of the D2D UE, stores the reallocated terminal ID and updates the reallocated terminal ID into context information of the D2D UE.

In the embodiment of the disclosure, the D2D UE may be a remote D2D UE, and the fifth D2D UE may be a relay D2D UE.

A computer-readable storage medium provided by another embodiment of the disclosure may store a computer-executable instruction, and the computer-executable instruction may be executed by a processor to implement the abovementioned method.

In the technical solutions of the embodiments of the disclosure, the first D2D UE judges whether the terminal ID of the first D2D UE conflicts with the terminal ID or the D2D group ID of the other D2D UE. When the terminal ID of the first D2D UE conflicts with the terminal ID or the D2D group ID of the other D2D UE, the terminal ID is reallocated to the first D2D UE, and the reallocated terminal ID of the first D2D UE is sent to the second D2D UE. Therefore, D2D UE may timely detect a terminal ID conflict and reacquire a new terminal ID, smooth D2D communication is ensured. A conflict between terminal IDs of D2D UEs for D2D unicast communication or a conflict between a terminal ID for D2D unicast communication and a D2D group ID of a multicast communication group is avoided.

After the drawings and detailed descriptions are read and understood, the other aspects may be comprehended.

DETAILED DESCRIPTION

Implementation of the embodiments of the disclosure will be elaborated below in combination with the drawings. The appended drawings are adopted not to limit the embodiments of the disclosure but only for description as references.

Figure 1:
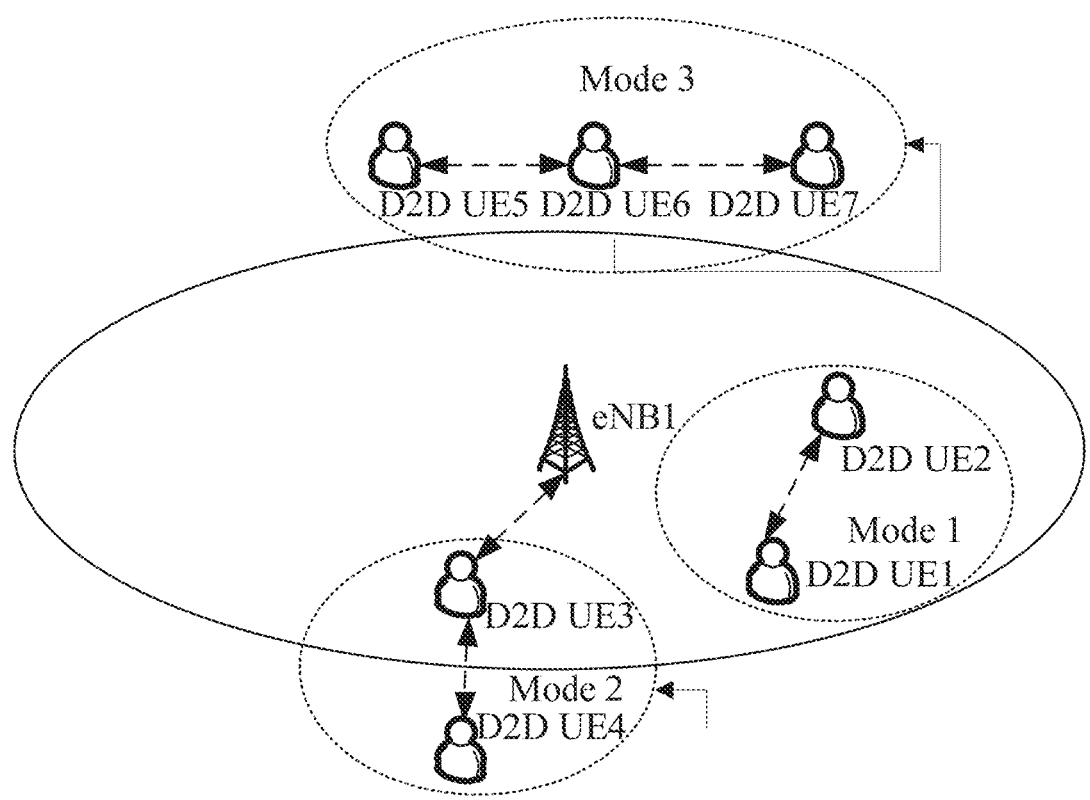
FIG. 1 is a schematic diagram of application modes of a D2D technology.
Figure 2:
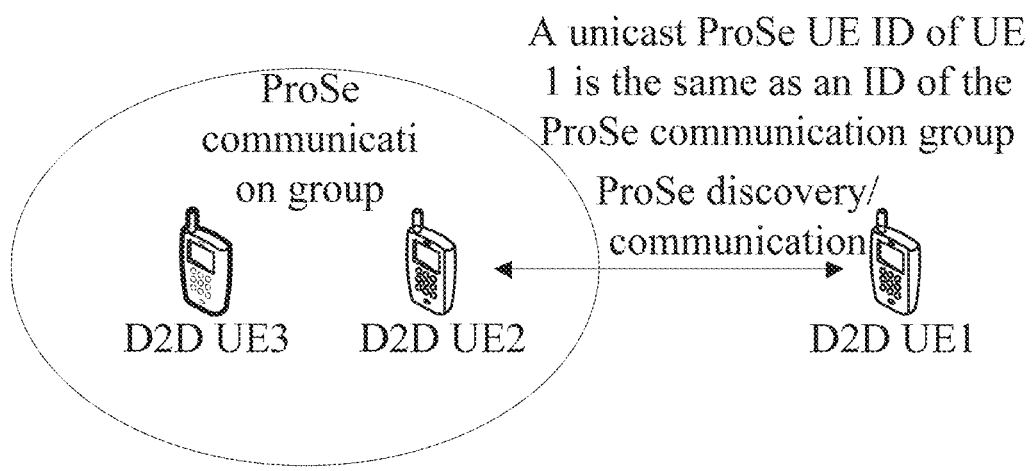
FIG. 2 is a schematic diagram of a D2D communication scenario.
Figure 3:
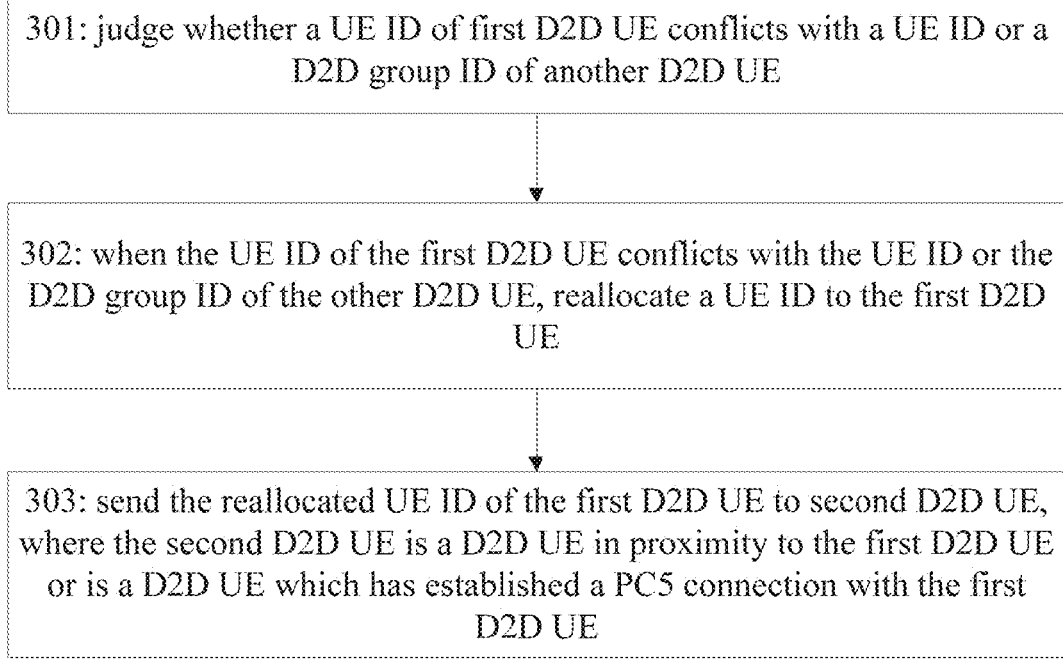
FIG. 3 is a flowchart of a D2D ID conflict resolution method according to an embodiment of the disclosure.

FIG. 3 is a flowchart of a D2D ID conflict resolution method according to an embodiment of the disclosure. The D2D ID conflict resolution method in the example is applied to first D2D UE. As shown in FIG. 3, the D2D ID conflict resolution method includes the following steps.

In Step 301, whether a terminal ID of the first D2D UE conflicts with a terminal ID or D2D group ID of another D2D UE or not is judged.

In the embodiment of the disclosure, whether the terminal ID of the first D2D UE conflicts with the terminal ID or D2D group ID of the other D2D UE may be judged in the following manners:

when a received data packet fails to be parsed, it is determined that the terminal ID of the first D2D UE conflicts with the terminal ID or the D2D group ID of the other D2D UE; or, when ID conflict indication information sent from third D2D UE is received, it is determined that the terminal ID of the first D2D UE conflicts with the terminal ID or D2D group ID of the other D2D UE, where the ID conflict indication information is arranged to indicate that the terminal ID of the first D2D UE conflicts with the terminal ID or the D2D group ID of the other D2D UE.

In the solution, the condition that the received data packet fails to be parsed includes the following cases:

a PDCP layer of the first D2D UE fails to decrypt the received data packet; or, the first D2D UE judges that a target IP address of the received data packet is inconsistent with an IP address of the first D2D UE; or, an application layer of the first D2D UE determines that the received data packet has an an error.

In the solution, the action of receiving, by the first D2D UE, the ID conflict indication information sent from the third D2D UE may implement reception in, but not limited to, the following forms:

the ID conflict indication information sent from the third D2D UE is received by receiving a MAC CE of a unicast D2D communication physical channel; or, the ID conflict indication information sent from the third D2D UE is received by receiving a PC5 interface signaling; or, the ID conflict indication information sent from the third D2D UE is received by receiving a unicast D2D communication data packet; or, the ID conflict indication information sent from the third D2D UE is received by receiving a D2D discovery message.

In the embodiment of the disclosure, before the first D2D UE receives the ID conflict indication information sent from the third D2D UE, the third D2D UE detects that the terminal ID of the first D2D UE conflicts with the terminal ID or D2D group ID of the other D2D UE.

Where, the third D2D UE detects that the terminal ID of the first D2D UE is the same as the terminal ID or D2D group ID of the other D2D UE through a received D2D discovery message sent from the first D2D UE; or, the third D2D UE detects that the terminal ID of the first D2D UE is the same as the terminal ID or D2D group ID of the other D2D UE through received PC5 interface signaling sent from the first D2D UE; or, the third D2D UE detects that the terminal ID of the first D2D UE is the same as the terminal ID or D2D group ID of the other D2D UE through a MAC PDU of a received data packet sent from the first D2D UE.

The solution provides three manners of acquiring the terminal ID of the first D2D UE and detects a sending conflict, i.e., 1) the D2D discovery message, 2) the PC5 interface signaling and 3) an ID included in the MAC PDU respectively, where the PC5 interface signaling may be a PC5 connection establishment message, for example, a direct communication request message, and PC5 connection and the other two are different manners.

In the embodiment of the disclosure, the first D2D UE is a remote D2D UE or a relay D2D UE or a D2D UE; second D2D UE is a remote D2D UE or a relay D2D UE or a D2D UE; and the third D2D UE is a remote D2D UE or a relay D2D UE or a D2D UE.

Here, D2D UE refers to ordinary D2D UE which is not remote D2D UE and not relay D2D UE.

In Step 302, when the terminal ID of the first D2D UE conflicts with the terminal ID or D2D group ID of the other D2D UE, a terminal ID is reallocated to the first D2D UE.

In the embodiment of the disclosure, the first D2D UE reallocates the new terminal ID to itself, and the reallocated new terminal ID is different from the old terminal ID of the first D2D UE.

In Step 303, the reallocated terminal ID of the first D2D UE is sent to second D2D UE, the second D2D UE being proximal D2D UE of the first D2D UE or D2D UE which has established a PC5 connection with the first D2D UE.

In the embodiment of the disclosure, the first D2D UE sends the reallocated terminal ID of the first D2D UE to the second D2D UE.

At least one of an old terminal ID, the reallocated terminal ID, a connection release indication or an ID change indication of the first D2D UE is sent to the second D2D UE through a D2D discovery message; or At least one of the old terminal ID, the reallocated terminal ID, the connection release indication or the ID change indication of the first D2D UE is sent to the second D2D UE through a D2D communication MAC CE; or, At least one of the old terminal ID, the reallocated terminal ID, the connection release indication or the ID change indication of the first D2D UE is sent to the second D2D UE through PC5 interface signaling; or, At least one of the old terminal ID, the reallocated terminal ID, the the connection release indication or the ID change indication of the first D2D UE is sent to the second D2D UE through a D2D communication data packet.

In the solution, after the terminal ID of the first D2D UE is reallocated, the original PC5 connection is released, and a connection is reestablished between the D2D UE by virtue of the reallocated terminal ID of the first D2D UE, so that the first D2D UE sends at least one of the old terminal ID or the reallocated terminal ID to the second D2D UE, and meanwhile, may further send at least one of the connection release indication or the ID change indication to the second D2D UE.

In the embodiment of the disclosure, after the terminal ID is reallocated to the first D2D UE, the first D2D UE sends the reallocated terminal ID of the first D2D UE to a base station which, upon reception of the reallocated terminal ID of the first D2D UE, stores the reallocated terminal ID and update the reallocated terminal ID into context information of the fourth D2D UE.

On the basis of the solution, upon reception of at least one of the connection release indication or ID change indication sent from the first D2D UE, the second D2D UE releases the PC5 connection with the first D2D UE.

In the embodiment of the disclosure, upon reception of the reallocated terminal ID of the first D2D UE, the second D2D UE starts using the reallocated terminal ID of the first D2D UE as a target ID for sending D2D data to the first D2D UE, and correspondingly, upon reception of a data packet sent from the second D2D UE, with the reallocated terminal ID of the first D2D UE as the target ID, the first D2D UE starts using the reallocated terminal ID of the first D2D UE as a source ID for sending D2D data to the second D2D UE. Or, upon reception of the reallocated terminal ID of the first D2D UE, the second D2D UE sends terminal ID reception confirmation information to the first D2D UE through a D2D communication data packet, and correspondingly, upon reception of the terminal ID reception confirmation information sent from the second D2D UE, the first D2D UE starts using the reallocated terminal ID of the first D2D UE as the source ID for sending the D2D data to the second D2D UE.

In the embodiment of the disclosure, after the reallocated terminal ID of the first D2D UE is sent to the second D2D UE, the first D2D UE and the second D2D UE start using the reallocated terminal ID for data transmission after a current modification period, where the second D2D UE is a D2D UE which has established the PC5 connection with the first D2D UE and the modification period is configured by the base station or a ProSe server or a network element of a core network.

Figure 4:
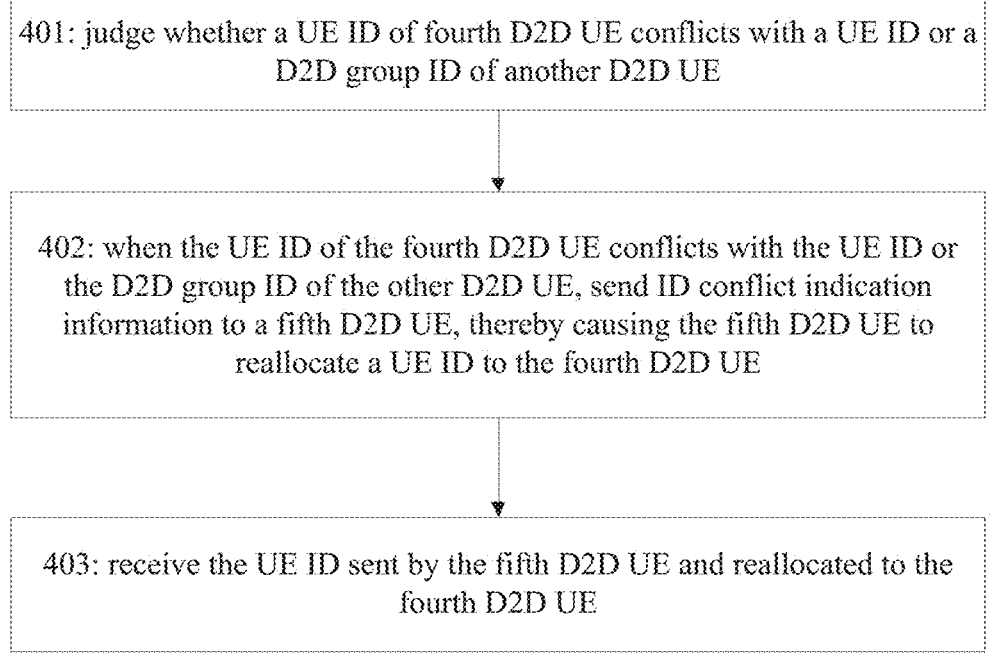
FIG. 4 is a flowchart of a D2D ID conflict resolution method according to another embodiment of the disclosure.

FIG. 4 is a flowchart of a D2D ID conflict resolution method according to another embodiment of the disclosure. The D2D ID conflict resolution method in the example is applied to fourth D2D UE. As shown in FIG. 4, the D2D ID conflict resolution method includes the following steps.

In Step 401, whether a terminal ID of the fourth D2D UE conflicts with a terminal ID or a D2D group ID of another D2D UE is judged.

In the embodiment of the disclosure, whether the terminal ID of the fourth D2D UE conflicts with the terminal ID or D2D group ID of the other D2D UE may be judged in the following manners:

when a received data packet fails to be parsed, it is determined that the terminal ID of the fourth D2D UE conflicts with the terminal ID or D2D group ID of the other D2D UE; or, when the ID conflict indication information sent from sixth D2D UE is received, it is determined that the terminal ID of the fourth D2D UE conflicts with the terminal ID or the D2D group ID of the other D2D UE, where the ID conflict indication information is arranged to indicate that the terminal ID of the fourth D2D UE conflicts with the terminal ID or the D2D group ID of the other D2D UE.

In the embodiment of the disclosure, the action of receiving, by the fourth D2D UE, the ID conflict indication information sent from the sixth D2D UE may implement reception in, but not limited to, the following manners:

the ID conflict indication information sent from the sixth D2D UE is received by receiving a unicast D2D communication MAC CE; or, the ID conflict indication information sent from the sixth D2D UE is received by receiving a PC5 interface signaling; or, the ID conflict indication information sent from the sixth D2D UE is received by receiving a unicast D2D communication data packet; or, the ID conflict indication information sent from the sixth D2D UE is received by receiving a D2D discovery message.

In the embodiment of the disclosure, before the fourth D2D UE receives the ID conflict indication information sent from the sixth D2D UE, the sixth D2D UE detects that the terminal ID of the fourth D2D UE conflicts with the terminal ID or D2D group ID of the other D2D UE.

Where, the sixth D2D UE detects that the terminal ID of the fourth D2D UE is the same as the terminal ID or D2D group ID of the other D2D UE through a received D2D discovery message sent from the fourth D2D UE; or, the sixth D2D UE detects that the terminal ID of the fourth D2D UE is the same as the terminal ID or D2D group ID of the other D2D UE through a received PC5 interface signaling sent from the fourth D2D UE; or, the sixth D2D UE detects that the terminal ID of the fourth D2D UE is the same as the terminal ID or D2D group ID of the other D2D UE through a MAC PDU of a received data packet sent from the fourth D2D UE.

In Step 402, when the terminal ID of the fourth D2D UE conflicts with the terminal ID or D2D group ID of the other D2D UE, ID conflict indication information is sent to fifth D2D UE, thereby causing the fifth D2D UE to reallocate a terminal ID to the fourth D2D UE.

In the embodiment of the disclosure, the action of sending, by the fourth D2D UE, the ID conflict indication information to the fifth D2D UE may implement sending in, but not limited to, the following manners:

an ID conflict indication is sent to the fifth D2D UE through a unicast D2D communication MAC CE; or, the ID conflict indication is sent to the fifth D2D UE through a PC5 interface signaling; or, the ID conflict indication is sent to the fifth D2D UE through a unicast D2D communication data packet; or;

the ID conflict indication is sent to the fifth D2D UE through a D2D discovery message.

In Step 403, the terminal ID sent from the fifth D2D UE and reallocated to the fourth D2D UE is received.

In the embodiment of the disclosure, the fourth D2D UE receives the terminal ID sent from the fifth D2D UE and reallocated to the fourth D2D UE, that is, the fifth D2D UE sends the terminal ID reallocated to the fourth D2D UE to the fourth D2D UE.

The fourth D2D UE receives the terminal ID sent from the fifth D2D UE and reallocated to the fourth D2D UE through a unicast D2D communication MAC CE; or, the fourth D2D UE receives the terminal ID sent from the fifth D2D UE and reallocated to the fourth D2D UE through a PC5 interface signaling; or, the fourth D2D UE receives the terminal ID sent from the fifth D2D UE and reallocated to the fourth D2D UE through a unicast D2D communication data packet; or, the fourth D2D UE receives the terminal ID sent from the fifth D2D UE and reallocated to the fourth D2D UE through a D2D discovery message.

In the embodiment of the disclosure, after obtaining the reallocated terminal ID, the fourth D2D UE sends the reallocated terminal ID to a D2D UE in proximity to the fourth D2D UE, or to a D2D UE which has established a connection with the fourth D2D UE.

In the embodiment of the disclosure, after obtaining the reallocated terminal ID, the fourth D2D UE sends the reallocated terminal ID to base station, and after receiving the reallocated terminal ID of the fourth D2D UE, the base station stores the reallocated terminal ID and updates the reallocated terminal ID into context information of the fourth D2D UE.

In the solution, the fourth D2D UE is a remote D2D UE, and the fifth D2D UE is a relay D2D UE.

The D2D ID conflict resolution method of the embodiments of the disclosure will be further elaborated below in combination with practical scenarios. It is important to note that D2D UE in the embodiments of the disclosure may be a relay D2D UE, or a remote D2D UE, or an ordinary D2D UE.

First Embodiment

Figure 5:
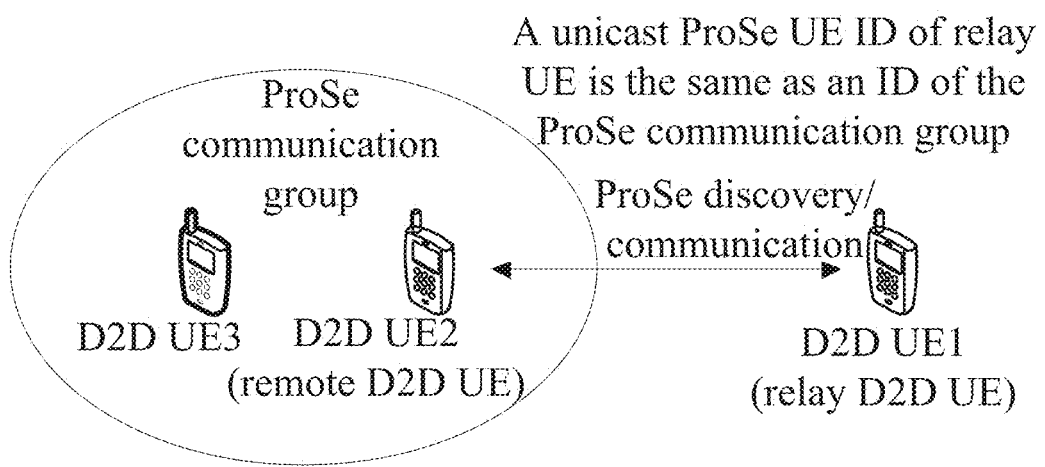
FIG. 5 is a scenario diagram of embodiment 1 of the disclosure.
Figure 6:
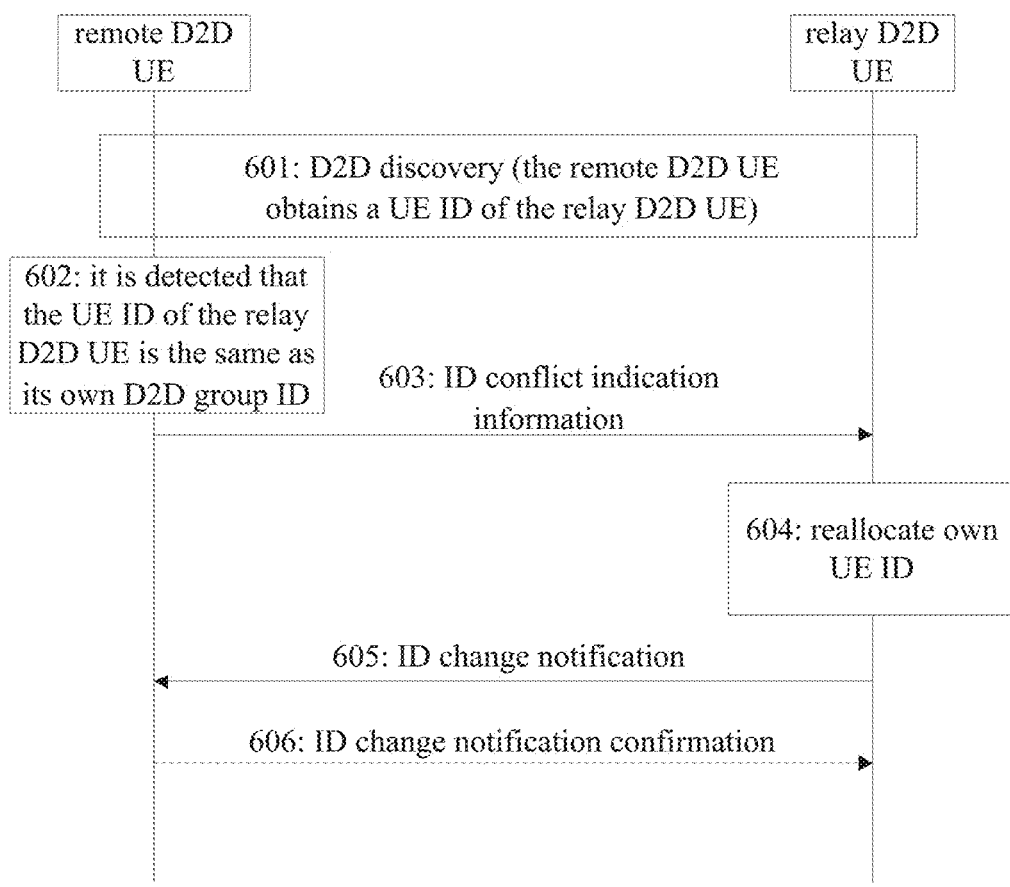
FIG. 6 is a flowchart of a D2D ID conflict resolution method according to embodiment 1 of the disclosure.

A scenario where a unicast ProSe D2D terminal ID of relay D2D UE is the same as a ProSe communication group ID is described in the embodiment. FIG. 5 is a scenario diagram of the embodiment. As shown in FIG. 5, D2D UE 3 and D2D UE 2 (remote D2D UE) belong to the same D2D communication group, and may perform D2D group communication. D2D UE 1 (relay D2D UE) does not belong to the D2D communication group, but the D2D UE 1 may perform one-to-one D2D discovery/communication with the D2D UE 2 or the D2D UE 3. There is made such a hypothesis that a unicast ProSe D2D terminal ID of the relay D2D UE is the same as a ProSe Layer-2 Group ID of a ProSe communication group (formed by the remote D2D UE and the D2D UE 3), that is, there exists an ID conflict, and then the relay D2D UE and D2D UE (including the D2D UE 2 and the D2D UE 3) in the D2D communication group may all receive a MAC PDU of which a target ID is the same ID. For solving this ID conflict problem, the solution of the embodiment of the disclosure may be adopted. FIG. 6 is a flowchart of a D2D ID conflict resolution method according to embodiment 1 of the disclosure. As shown in FIG. 6, the method of the embodiment includes the following steps.

In Step 601, the remote D2D UE obtains the unicast ProSe D2D terminal ID of the relay D2D UE through a D2D discovery process.

Where, the remote D2D UE obtains the unicast ProSe D2D terminal ID of the relay D2D UE through a received D2D discovery message sent from the relay D2D UE.

In Step 602, the remote D2D UE detects that the unicast ProSe D2D terminal ID of the relay D2D UE is the same as the Layer-2 Group ID of the D2D communication group it joins, and then determines that there exists an ID conflict between the ProSe D2D terminal ID of the relay D2D UE and the D2D group ID.

Optionally, the remote D2D UE may further obtain the unicast ProSe D2D terminal ID of the relay D2D UE in a PC5 connection establishment process and detect a conflict between the ID of the relay D2D UE and its own group ID, where the remote D2D UE may obtain the unicast ProSe D2D terminal ID of the relay D2D UE through a received PC5 connection establishment response message sent from the relay D2D UE. Or, the remote D2D UE may obtain the D2D terminal ID of the relay D2D UE and detect that the ProSe D2D terminal ID of the relay D2D UE conflicts with its own group ID by receiving a D2D communication data packet of the relay D2D UE after establishing a PC5 connection with the relay D2D UE.

In Step 603, the remote D2D UE sends ID conflict indication information arranged to indicate that the ProSe D2D terminal ID of the relay D2D UE conflicts with another D2D terminal ID or group ID to the relay D2D UE.

Where, the remote D2D UE may send the ID conflict indication information to the relay D2D UE in the following manners:

1) the remote D2D UE sends the ID conflict indication information to the relay D2D UE through a unicast D2D communication MAC CE after completing establishment of the PC5 connection with the relay D2D UE; or, 2) the remote D2D UE sends the ID conflict indication information to the relay D2D UE through PC5 interface signaling after completing relay discovery with the relay D2D UE, where the PC5 interface signaling may be a PC5 connection establishment request message or additional PC5 interface signaling; or, 3) the remote D2D UE sends the ID conflict indication information to the relay D2D UE through a unicast D2D communication data packet manner after completing establishment of the PC5 connection with the relay D2D UE; or, 4) the remote D2D UE sends the ID conflict indication information to the relay D2D UE through a D2D discovery message, the D2D discovery message further including the ProSe D2D terminal ID of the relay D2D UE.

In Step 604, the relay D2D UE reallocates its own ProSe D2D terminal ID after receiving the ID conflict indication information sent from the remote D2D UE.

In Step 605, after reallocating its own ProSe D2D terminal ID, the relay D2D UE sends its own updated ProSe D2D terminal ID to the remote D2D UE which has established the PC5 connection with it and proximal D2D UE.

The relay D2D UE may send ID change notification information in the following manners:

1) the relay D2D UE sends its own updated ProSe D2D terminal ID to the remote D2D UE which has established the PC5 connection with it through a unicast D2D communication MAC CE:

2) the relay D2D UE sends its own updated ProSe D2D terminal ID to the remote D2D UE through PC5 interface signaling, where the PC5 interface signaling may be a PC5 connection establishment response message or additional PC5 interface signaling; or, 3) the relay D2D UE sends its own updated ProSe D2D terminal ID to the remote D2D UE which has established the PC5 connection with it through the unicast D2D communication data packet manner; or, 4) the relay D2D UE sends its own updated ProSe D2D terminal ID to the remote D2D UE through a D2D discovery message, the D2D discovery message including the new ProSe D2D terminal ID of the relay D2D UE or including the new and old ProSe D2D terminal IDs of the relay D2D UE.

The relay D2D UE sends at least one of a connection release indication or an ID change indication to the remote D2D UE which has established the PC5 connection with it.

In Step 606, after the remote D2D UE which has established the PC5 connection with the relay D2D UE receives the updated ProSe D2D terminal ID sent from the relay D2D UE, the remote D2D UE sends ID change notification confirmation information to the relay D2D UE.

For example, the ID change notification confirmation information may be a data packet using the updated ProSe D2D terminal ID of the relay D2D UE as a target ID, or, a D2D communication data packet of which a content is an ID change notification confirmation, or, may be sent through a unicast D2D communication MAC CE, or, may be sent through PC5 interface signaling, or, may be sent through a D2D discovery message.

Optionally, after receiving the updated ProSe D2D terminal ID sent from the relay D2D UE, the remote D2D UE starts using the updated ProSe D2D terminal ID as a target ID for sending a D2D communication data packet to the relay D2D UE. While after receiving the ID change notification confirmation information sent from the remote D2D UE, the relay D2D UE starts using the updated ProSe D2D terminal ID as a source ID for sending a D2D communication data packet to the remote D2D UE. Or, the relay D2D UE and the remote D2D UE which has established the PC5 connection with it start using the new ProSe D2D terminal ID for identifying information after a current modification period.

In addition, if the remote D2D UE receives at least one of the connection release indication or ID change indication sent from the relay D2D UE, the remote D2D UE releases the PC5 connection with the relay D2D UE, and reinitiates a relay discovery/PC5 connection establishment process. If the remote D2D UE further receives the updated ProSe D2D terminal ID sent from the relay D2D UE, the remote D2D UE may directly reinitiate the PC5 connection establishment process to the relay. D2D UE.

Second Embodiment

Figure 7:
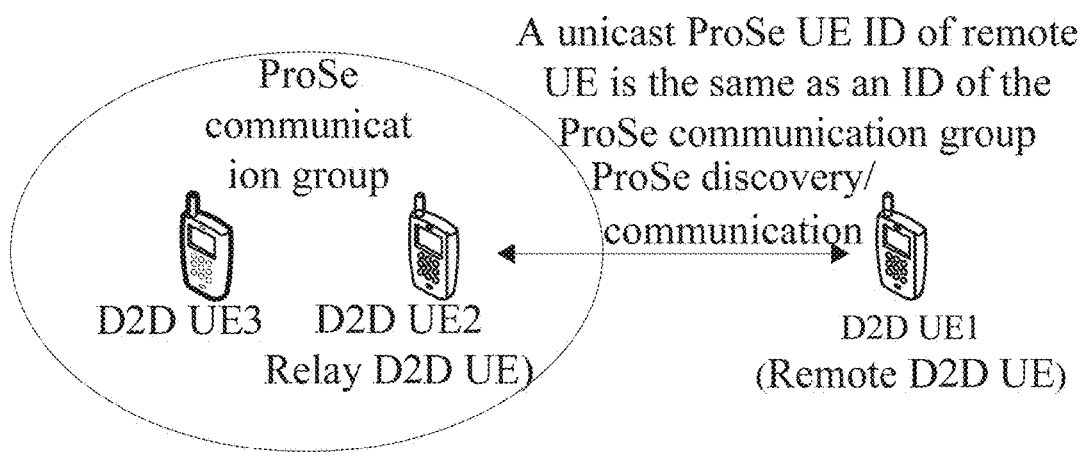
FIG. 7 is a scenario diagram of embodiment 2 of the disclosure.
Figure 8:
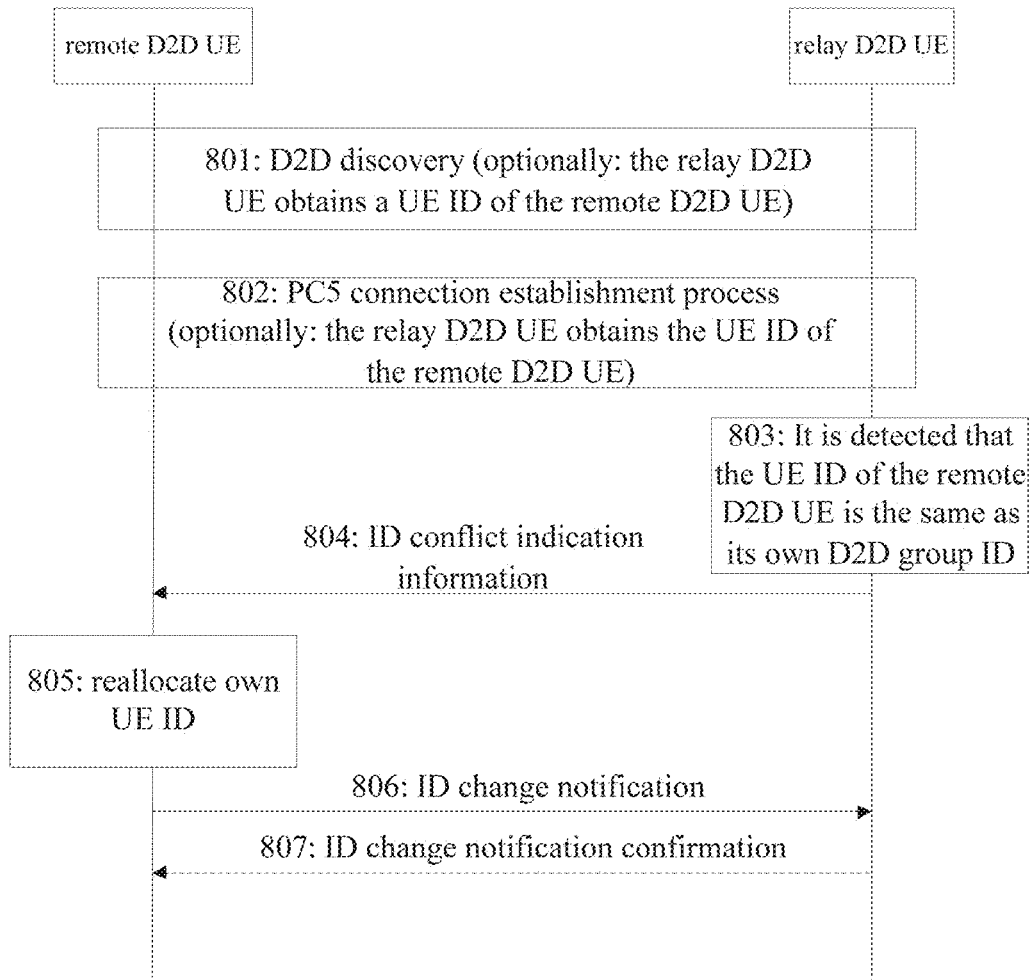
FIG. 8 is a flowchart of a D2D ID conflict resolution method according to embodiment 2 of the disclosure.

A scenario where a unicast ProSe D2D terminal ID of remote D2D UE is the same as a ProSe communication group ID is described in the embodiment. FIG. 7 is a scenario diagram of the embodiment. As shown in FIG. 7, D2D UE 3 and D2D UE 2 (relay D2D UE) belong to the same D2D communication group, and may perform D2D group communication. D2D UE 1 (remote D2D UE) does not belong to the D2D communication group, but the D2D UE 1 may perform one-to-one D2D discovery/communication with the D2D UE 2 or the D2D UE 3. There is made such a hypothesis that a unicast ProSe D2D terminal ID of the remote D2D UE is the same as a ProSe Layer-2 Group ID of a ProSe communication group (formed by the D2D UE a and the D2D UE 3), that is, there exists an ID conflict, and then the remote D2D UE and D2D UE (including the D2D UE 2 and the D2D UE 3) in the D2D communication group may all receive a MAC PDU of which a target ID is the same ID. For solving this ID conflict problem, the solution of the embodiment of the disclosure may be adopted. FIG. 8 is a flowchart of a D2D ID conflict resolution method according to embodiment 2 of the disclosure. As shown in FIG. 8, the method of the embodiment includes the following steps.

In Step 801, the relay D2D UE obtains the unicast ProSe D2D terminal ID of the remote D2D UE through a D2D discovery process.

Where, the relay D2D UE obtains the unicast ProSe D2D terminal ID of the remote D2D UE through a received D2D discovery message sent from the remote D2D UE.

In Step 802, the relay D2D UE obtains the unicast ProSe D2D terminal ID of the remote D2D UE in a PC5 connection establishment process.

Where, the relay D2D UE may obtain the unicast ProSe D2D terminal ID of the remote D2D UE through a received PC5 connection establishment response message sent from the remote D2D UE. Or, the relay D2D UE may obtain the D2D terminal ID of the remote D2D UE by receiving a D2D communication data packet of the remote D2D UE after establishing a PC5 connection with the remote D2D UE.

In Step 803, the relay D2D UE detects that the unicast ProSe D2D terminal ID of the remote D2D UE is the same as the Layer-2 Group ID of the D2D communication group it joins, and then determines that there exists an ID conflict between the ProSe D2D terminal ID of the remote D2D UE and the D2D group ID.

In Step 804, the relay D2D UE sends ID conflict indication information arranged to indicate that the ProSe D2D terminal ID of the remote D2D UE conflicts with another D2D terminal ID or group to the remote D2D UE.

Where, the relay D2D UE may send the ID conflict indication information to the remote D2D UE in the following manners:

1) the relay D2D UE sends the ID conflict indication information to the remote D2D UE through a unicast D2D communication MAC CE after completing establishment of the PC5 connection with the remote D2D UE; or, 2) the relay D2D UE sends the ID conflict indication information to the remote D2D UE through PC5 interface signaling after completing relay discovery with the remote D2D UE, where the PC5 interface signaling may be a PC5 connection establishment request message or additional PC5 interface signaling; or, 3) the relay D2D UE sends the ID conflict indication information to the remote D2D UE through a unicast D2D communication data packet manner after completing establishment of the PC5 connection with the remote D2D UE; or;

4) the relay D2D UE sends the ID conflict indication information to the remote D2D UE through a D2D discovery message, the D2D discovery message further including the ProSe D2D terminal ID of the remote D2D UE.

In Step 805, the remote D2D UE reallocates its own ProSe D2D terminal ID after receiving the ID conflict indication information sent from the relay D2D UE.

In Step 806, after reallocating its own ProSe D2D terminal ID, the remote D2D UE sends its own updated ProSe D2D terminal ID to the relay D2D UE which has established the PC5 connection with it and proximal D2D UE.

The remote D2D UE may send ID change notification information in the following manners:

1) the remote D2D UE sends its own updated ProSe D2D terminal ID to the relay D2D UE which has established the PC5 connection with it through a unicast D2D communication MAC CE;

2) the remote D2D UE sends its own updated ProSe D2D terminal ID to the relay D2D UE through PC5 interface signaling, where the PC5 interface signaling may be a PC5 connection establishment response message or additional PC5 interface signaling; or, 3) the remote D2D UE sends its own updated ProSe D2D terminal ID to the relay D2D UE which has established the PC5 connection with it through the unicast D2D communication data packet manner; or, 4) the remote D2D UE sends its own updated ProSe D2D terminal ID to the relay D2D UE through a D2D discovery message in a MODE B discovery process, the D2D discovery message including the new ProSe D2D terminal ID of the remote D2D UE or including the new and old ProSe D2D terminal IDs of the remote D2D UE.

The remote D2D UE sends at least one of a connection release indication or an ID change indication to the relay D2D UE which has established the PC5 connection with it.

In Step 807, after the relay D2D UE which has established the PC5 connection with the remote D2D UE receives the updated ProSe D2D terminal ID sent from the remote D2D UE, the relay D2D UE sends ID change notification confirmation information to the remote D2D UE.

For example, the ID change notification confirmation information may be a data packet using the updated ProSe D2D terminal ID of the remote D2D UE as a target ID, or, a D2D communication data packet of which a content is an ID change notification confirmation, or, may be sent through a unicast D2D communication MAC CE, or, may be sent through PC5 interface signaling, or, may be sent through a D2D discovery message.

Optionally, after receiving the updated ProSe D2D terminal ID sent from the remote D2D UE, the relay D2D UE starts using the updated ProSe D2D terminal ID as a target ID for sending a D2D communication data packet to the remote D2D UE. While after receiving the ID change notification confirmation information sent from the relay D2D UE, the remote D2D UE starts using the updated ProSe D2D terminal ID as a source ID for sending a D2D communication data packet to the relay D2D UE. Or, the remote D2D UE and the relay D2D UE which has established the PC5 connection with it start using the new ProSe D2D terminal ID for identifying information after a current modification period.

In addition, if the relay D2D UE receives at least one of the connection release indication or ID change indication sent from the remote D2D UE, the relay D2D UE releases the PC5 connection with the remote D2D UE, and the remote D2D UE reinitiates a relay discovery/PC5 connection establishment process.

Third Embodiment

Figure 9:
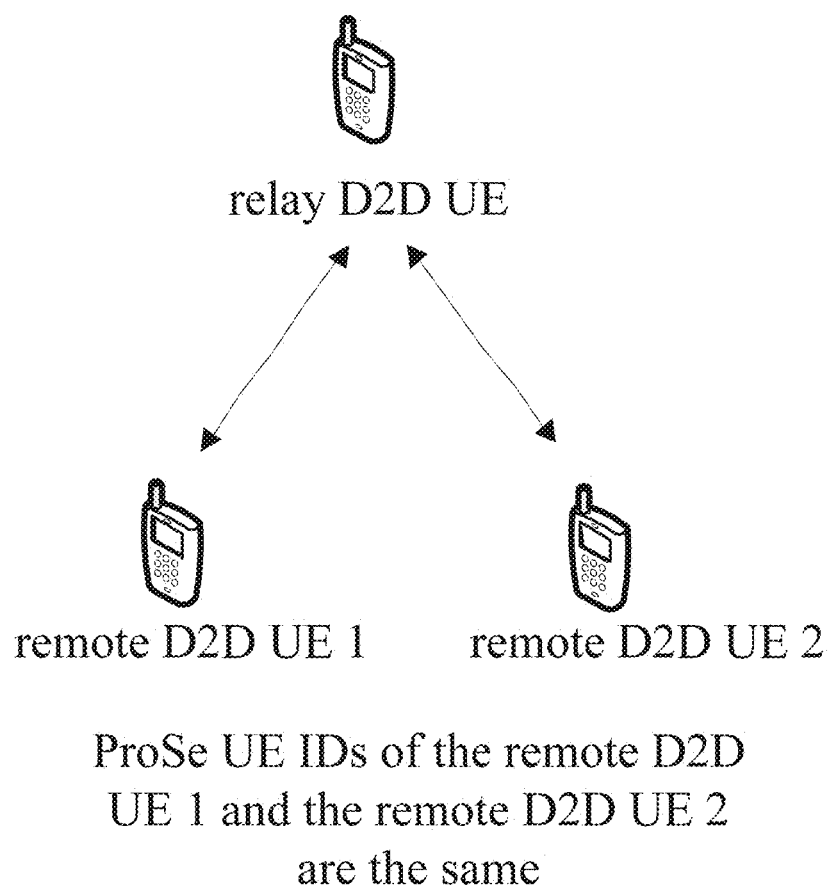
FIG. 9 is a scenario diagram of embodiment 3 of the disclosure.
Figure 10:
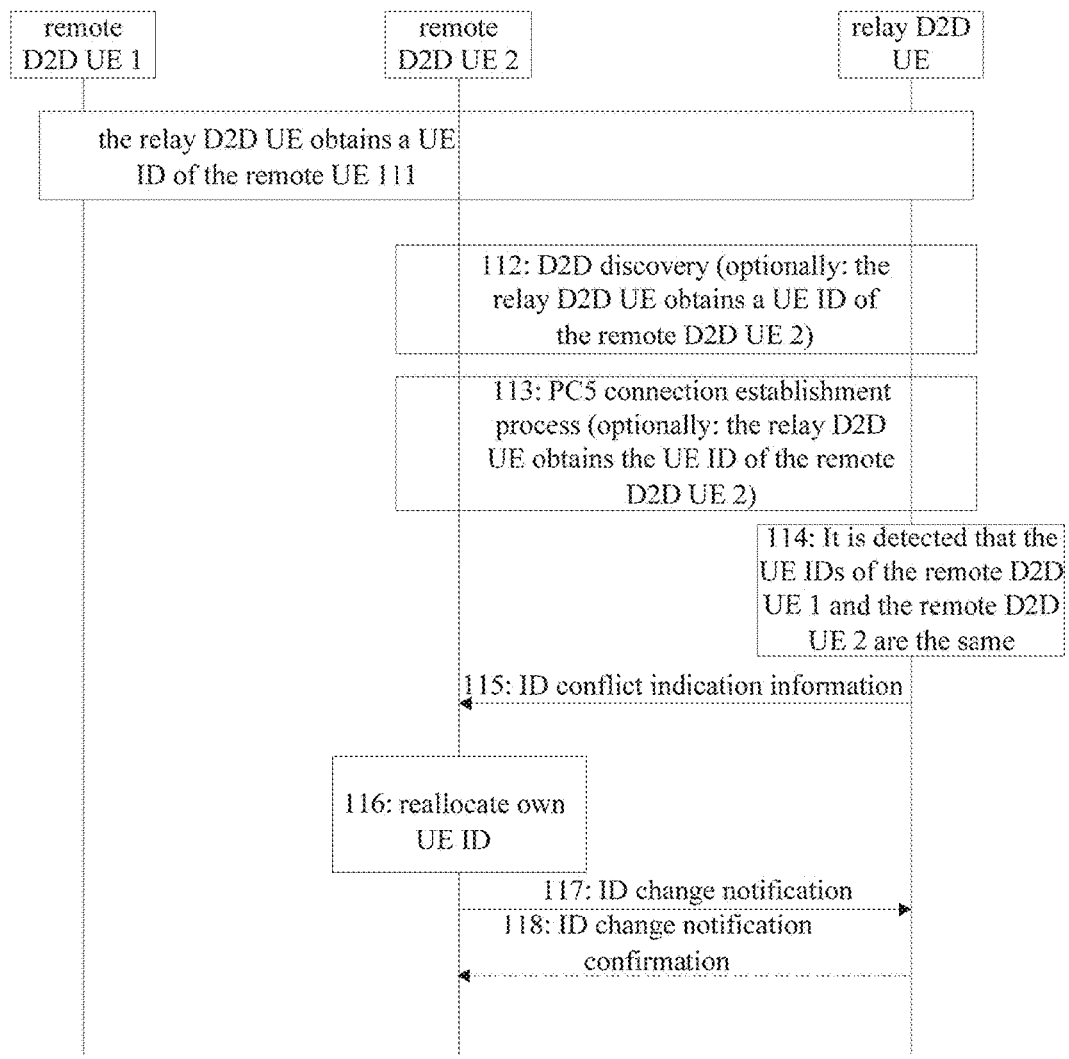
FIG. 10 is a flowchart of a D2D ID conflict resolution method according to embodiment 3 of the disclosure.

A scenario where unicast ProSe D2D terminal IDs of two pieces of remote D2D UE under a relay D2D UE conflict is described in the embodiment. FIG. 9 is a scenario diagram of the embodiment. As shown in FIG. 9, remote D2D UE 1 performs D2D communication through relay of relay D2D UE, then remote D2D UE 2 discovers the relay D2D UE and is intended to establish a PC5 connection with the relay D2D UE, and ProSe D2D terminal IDs of the remote D2D UE 1 and the remote D2D UE 2 are the same. FIG. 10 is a flowchart of a method according to embodiment 3 of the disclosure. As shown in FIG. 10, the method of the embodiment includes the following steps.

In Step 111, the remote D2D UE 1 discovers the relay D2D UE, and the D2D UE obtains the ProSe D2D terminal ID of the remote D2D UE 1.

The relay D2D UE may obtain the ProSe D2D terminal ID of the remote D2D UE 1 through a D2D discovery process or a PC5 connection establishment process or a D2D communication data packet.

In Step 112, the relay D2D UE obtains the unicast ProSe D2D terminal ID of the remote D2D UE 2 through a D2D discovery process.

The relay D2D UE obtains the ProSe D2D terminal ID of the remote D2D UE 2 through a received discovery message sent from the remote D2D UE 2.

In Step 113, the relay D2D UE obtains the unicast ProSe D2D terminal ID of the remote D2D UE 2 in a PC5 connection establishment process.

The relay D2D UE may obtain the unicast ProSe D2D terminal ID of the remote D2D UE 2 through a received PC5 connection establishment response message sent from the remote D2D UE 2. Or, the relay D2D UE may obtain the D2D terminal ID of the remote D2D UE 2 by receiving a D2D communication data packet of the remote D2D UE 2 after establishing a PC5 connection with the remote D2D UE 2.

In Step 114 the relay D2D UE detects that the ProSe D2D terminal IDs of the remote D2D UE 1 and the remote D2D UE 2 are the same, and then determines that there exists an ID conflict between the ProSe D2D terminal IDs of the remote D2D UE 1 and the remote D2D UE 2.

In Step 115, the relay D2D UE sends ID conflict indication information arranged to indicate that the ProSe D2D terminal ID of the remote D2D UE 2 conflicts with another D2D terminal ID or group ID to the remote D2D UE 2.

Where, the relay D2D UE may send the ID conflict indication information to the remote D2D UE 2 in the following manners:

1) the relay D2D UE sends the ID conflict indication information to the remote D2D UE 2 through a unicast D2D communication MAC CE after completing establishment of the PC5 connection with the remote D2D UE 2; or, 2) the relay D2D UE sends the ID conflict indication information to the remote D2D UE 2 through PC5 interface signaling after completing relay discovery with the remote D2D UE 2, where the PC5 interface signaling may be a PC5 connection establishment request message or additional PC5 interface signaling; or, 3) the relay D2D UE sends the ID conflict indication information to the remote D2D UE 2 through a unicast D2D communication data packet manner after completing establishment of the PC5 connection with the remote D2D UE 2; or, 4) the relay D2D UE sends the ID conflict indication information to the remote D2D UE 2 through a D2D discovery message, the D2D discovery message further including the ProSe D2D terminal ID of the remote D2D UE 2.

In Step 116, the remote D2D UE 2 reallocates its own ProSe D2D terminal D after receiving the ID conflict indication information sent from the relay D2D UE.

In Step 117, after reallocating its own ProSe D2D terminal ID, the remote D2D UE 2 sends its own updated ProSe D2D terminal ID to the relay D2D UE which has established the PC5 connection with it and proximal D2D UE.

Where, the remote D2D UE 2 may send ID change notification information in the following manners:

1) the remote D2D UE 2 sends its own updated ProSe D2D terminal ID to the relay D2D UE which has established the PC5 connection with it through a unicast D2D communication MAC CE;

2) the remote D2D UE 2 sends its own updated ProSe D2D terminal ID to the relay D2D UE through PC5 interface signaling, where the PC5 interface signaling may be a PC5 connection establishment response message or additional PC5 interface signaling; or, 3) the remote D2D UE 2 sends its own updated ProSe D2D terminal ID to the relay D2D UE which has established the PC5 connection with it through the unicast D2D communication data packet manner; or, 4) the remote D2D UE 2 sends its own updated ProSe D2D terminal ID to the relay D2D UE through a D2D discovery message in a MODE B discovery process, the D2D discovery message including the new ProSe D2D terminal ID of the remote D2D UE or including the new and old ProSe D2D terminal IDs of the remote D2D UE.

The remote D2D UE 2 sends at least one of a connection release indication or an ID change indication to the relay D2D UE which has established the PC5 connection with it.

In Step 118, after the relay D2D UE which has established the PC5 connection with the remote D2D UE 2 receives the updated ProSe D2D terminal ID sent from the remote D2D UE 2, the relay D2D UE sends ID change notification confirmation information to the remote D2D UE 2.

For example, the ID change notification confirmation information may be a data packet using the updated ProSe D2D terminal ID of the remote D2D UE 2 as a target ID, or, a D2D communication data packet of which a content is an ID change notification confirmation, or, may be sent through a unicast D2D communication MAC CE, or, may be sent through PC5 interface signaling, or, may be sent through a D2D discovery message.

Optionally, after receiving the updated ProSe D2D terminal ID sent from the remote D2D UE 2, the relay D2D UE starts using the updated ProSe D2D terminal ID as a target ID for sending a D2D communication data packet to the remote D2D UE 2. While after receiving the ID change notification confirmation information sent from the relay D2D UE, the remote D2D UE 2 starts using the updated ProSe D2D terminal ID as a source ID for sending a D2D communication data packet to the relay D2D UE. Or, the remote D2D UE 2 and the relay D2D UE which has established the PC5 connection with it start using the new ProSe D2D terminal ID for identifying information after a current modification period.

In addition, if the relay D2D UE receives at least one of the connection release indication or ID change indication sent from the remote D2D UE 2, the relay D2D UE releases the PC5 connection with the remote D2D UE 2, and the remote D2D UE 2 reinitiates a relay discovery/PC5 connection establishment process.

Fourth Embodiment

Figure 11:
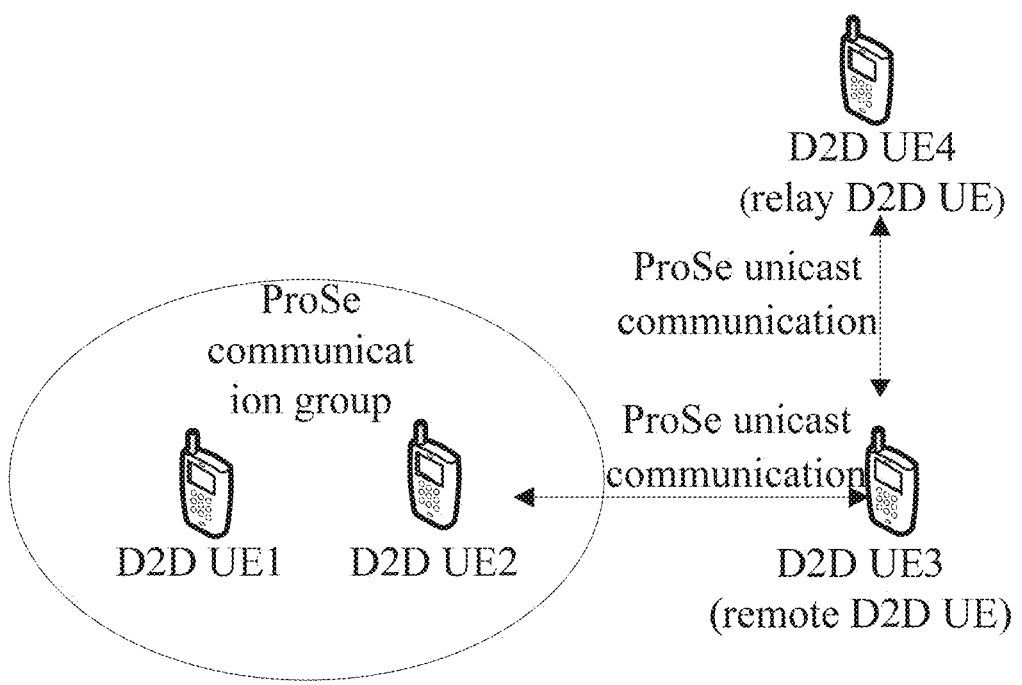
FIG. 11 is a scenario diagram of embodiment 4 of the disclosure.
Figure 12:
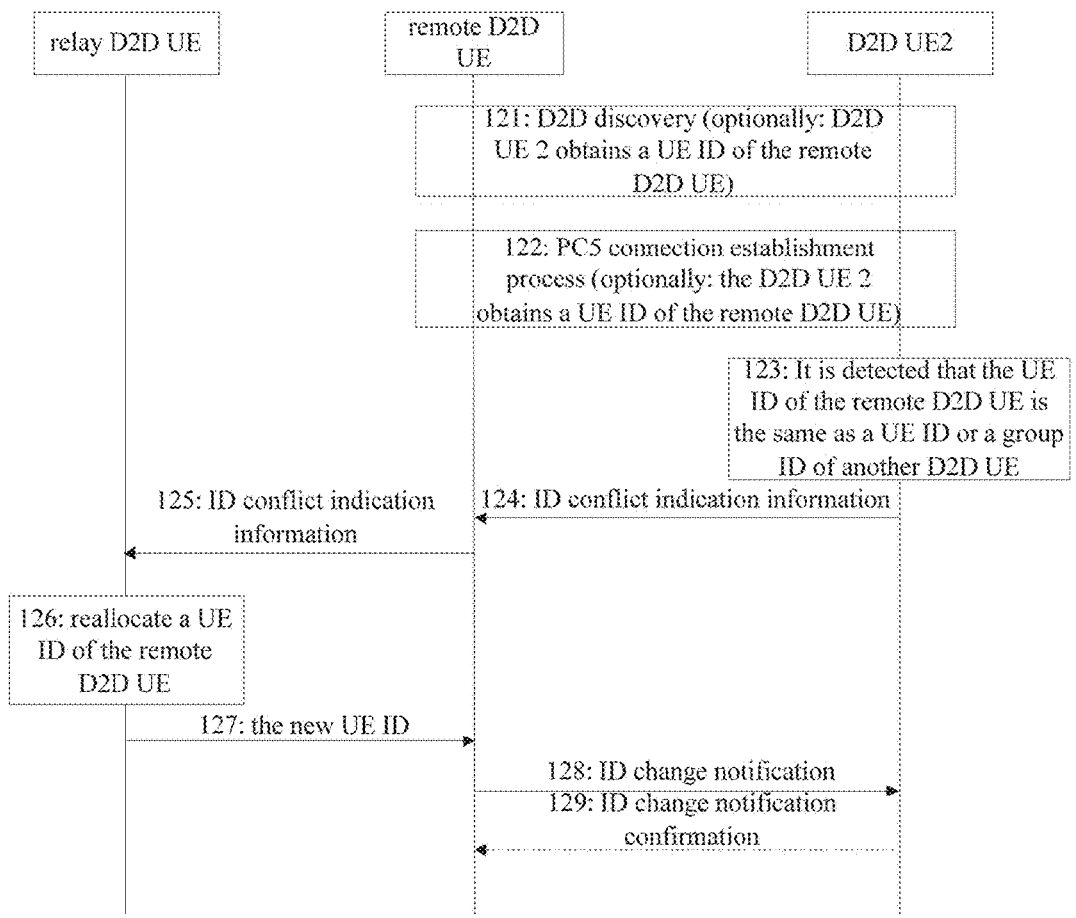
FIG. 12 is a flowchart of a D2D ID conflict resolution method according to embodiment 4 of the disclosure.

A scenario where an ID of remote D2D UE conflicts with a terminal ID or group ID of another D2D UE when a manner that a relay D2D UE allocates the unicast ProSe terminal ID to the remote D2D UE is described in the embodiment. FIG. 11 is a scenario diagram of the embodiment. As shown in FIG. 11, D2D UE 3 (remote D2D UE) performs D2D communication through relay of D2D UE 4 (relay D2D UE). D2D UE 1 and D2D UE 2 belong to the same D2D communication group, and may perform D2D group communication. D2D UE 3 (remote D2D UE) does not belong to the D2D communication group, but the D2D UE 3 may perform one-to-one D2D discovery/communication with the D2D UE 1 or the D2D UE 2. There is made such a hypothesis that a unicast ProSe terminal ID of the D2D UE 3 (remote D2D UE) is the same as a ProSe Layer-2 Group ID of a ProSe communication group (formed by the D2D UE 1 and the D2D UE 2), that is, there exists an ID conflict, and then the remote D2D UE and D2D UE (including the D2D UE 1 and the D2D UE 2) in the D2D communication group may all receive a MAC PDU of which a target ID is the same ID. FIG. 12 is a flowchart of a D2D ID conflict resolution method according to embodiment 4 of the disclosure. As shown in FIG. 12, the method of the embodiment includes the following steps.

In Step 121, the D2D UE 2 obtains the unicast ProSe terminal ID of the remote D2D UE through a D2D discovery process.

The UE 2 obtains the unicast ProSe terminal ID of the relay D2D UE through a D2D discovery message sent from the remote D2D UE.

In Step 122, the D2D UE 2 obtains the unicast ProSe terminal ID of the remote D2D UE in a PC5 connection establishment process.

The D2D UE 2 may obtain the unicast ProSe terminal ID of the remote D2D UE through a received PC5 connection establishment response message sent from the remote D2D UE. Or, the D2D UE 2 may obtain the terminal ID of the remote D2D UE by receiving a D2D communication data packet of the remote D2D UE after establishing a PC5 connection with the remote D2D UE.

In Step 123, the D2D UE 2 detects that the unicast ProSe terminal ID of the D2D UE 3 (remote D2D UE) is the same as the ProSe Layer-2 Group ID of the ProSe communication group (formed by the D2D UE 1 and the D2D UE 2), and then determines that there exists an ID conflict of the terminal ID of the remote D2D UE.

In Step 124, the D2D UE 2 sends ID conflict indication information arranged to indicate that the ProSe terminal ID of the remote D2D UE conflicts with another terminal ID or group ID to the remote D2D UE.

Where, the D2D UE 2 may send the ID conflict indication information to the remote D2D UE in the following manners:

1) the D2D UE 2 sends the ID conflict indication information to the remote D2D UE through a unicast D2D communication MAC CE after completing establishment of the PC5 connection with the remote D2D UE; or, 2) the D2D UE 2 sends the ID conflict indication information to the remote D2D UE through PC5 interface signaling after completing D2D discovery with the remote D2D UE, where the PC5 interface signaling may be a PC5 connection establishment request message or additional PC5 interface signaling; or, 3) the D2D UE 2 sends the ID conflict indication information to the remote D2D UE through a unicast D2D communication data packet manner after completing establishment of the PC5 connection with the remote D2D UE; or, 4) the D2D UE 2 sends the ID conflict indication information to the remote D2D UE through a D2D discovery message, the D2D discovery message further including the ProSe terminal ID of the remote D2D UE.

In Step 125, the remote D2D UE sends the ID conflict indication information to the relay D2D UE after receiving the ID conflict indication information sent from the D2D UE 2.

Where, the remote D2D UE may send the ID conflict indication information to the relay D2D UE in the following manners:

1) the remote D2D UE sends the ID conflict indication information to the relay D2D UE through a unicast D2D communication MAC CE after completing establishment of a PC5 connection with the relay D2D UE; or, 2) the remote D2D UE sends the ID conflict indication information to the relay D2D UE through PC5 interface signaling after completing relay discovery with the relay D2D UE, where the PC5 interface signaling may be a PC5 connection establishment request message or additional PC5 interface signaling; or, 3) the remote D2D UE sends the ID conflict indication information to the relay D2D UE through the unicast D2D communication data packet manner after completing establishment of the PC5 connection with the relay D2D UE; or, 4) the remote D2D UE sends the ID conflict indication information to the relay D2D UE through a D2D discovery message, the D2D discovery message further including the ProSe terminal ID of the remote D2D UE.

In Step 126, the relay D2D UE reallocates a ProSe terminal ID to the remote D2D UE.

In Step 127, after reallocating the ProSe UD ID to the remote D2D UE, the relay D2D UE sends the new ProSe terminal ID of the remote D2D UE to the remote D2D UE.

The relay D2D UE may send the new ProSe terminal ID of the remote D2D UE to the remote D2D UE in the following manners:

1) the relay D2D UE sends the reallocated ProSe terminal ID to the remote D2D UE which has established the PC5 connection with it through a unicast D2D communication MAC CE; or, 2) the relay D2D UE sends the reallocated ProSe terminal ID to the remote D2D UE through PC5 interface signaling, where the PC5 interface signaling may be a PC5 connection establishment request message or additional PC5 interface signaling; or, 3) the relay D2D UE sends the reallocated ProSe terminal ID to the remote D2D UE which has established the PC5 connection with it through the unicast D2D communication data packet manner; or, 4) the relay D2D UE sends the reallocated ProSe terminal ID to the remote D2D UE through a D2D discovery message, the D2D discovery message including the new ProSe terminal ID of the remote D2D UE or including the new and old ProSe terminal IDs of the remote D2D UE.

In Step 128, the remote D2D UE sends its own new ProSe terminal ID to the D2D UE which has established the PC5 connection with it and proximal D2D UE.

Where, the remote D2D UE may send ID change notification information in the following manners:

1) the remote D2D UE sends its own updated ProSe terminal ID to the D2D UE which has established the PC5 connection with it through a unicast D2D communication MAC CE;

2) the remote D2D UE sends its own updated ProSe terminal ID to the D2D UE which has established the PC5 connection with it through PC5 interface signaling, where the PC5 interface signaling may be a PC5 connection establishment response message or additional PC5 interface signaling; or, 3) the remote D2D UE sends its own updated ProSe terminal ID to the D2D UE which has established the PC5 connection with it through the unicast D2D communication data packet manner; or, 4) the remote D2D UE sends its own updated ProSe terminal ID to the D2D UE which has established the PC5 connection with it or the proximal D2D UE through a D2D discovery message, the D2D discovery message including the new ProSe terminal ID of the remote D2D UE or including the new and old ProSe terminal IDs of the remote D2D UE.

Or, the remote D2D UE sends at least one of a connection release indication or an ID change indication to the D2D UE which has established the PC5 connection with it.

Optionally, if the remote D2D UE is covered by a cellular cell, the remote D2D UE reports the new ProSe terminal ID to a base station after obtaining the new ProSe terminal ID, and the base station stores the new ProSe terminal ID of the remote D2D UE after receiving it, and updates a context of the D2D UE.

In Step 129, after the D2D UE which has established the PC5 connection with the remote D2D UE receives the updated ProSe terminal ID sent from the remote D2D UE, the D2D UE sends ID change notification confirmation information to the remote D2D UE.

For example, the ID change notification confirmation information may be a data packet using the updated ProSe terminal ID of the remote D2D UE as a target ID, or, a D2D communication data packet of which a content is an ID change notification confirmation, or, may be sent through a unicast D2D communication MAC CE, or, may be sent through PC5 interface signaling, or, may be sent through a D2D discovery message.

Optionally, after receiving the updated ProSe terminal ID sent from the remote D2D UE, the D2D UE starts using the updated ProSe terminal ID as a target ID for sending a D2D communication data packet to the remote D2D UE. While after receiving the ID change notification confirmation information sent from the D2D UE, the remote D2D UE starts using the updated ProSe terminal ID as a source ID for sending a D2D communication data packet to the D2D UE. Or, the remote D2D UE and the D2D UE which has established the PC5 connection with it start using the new ProSe terminal ID for identifying information after a current modification period.

In addition, if the D2D UE receives at least one of the connection release indication or ID change indication sent from the remote D2D UE, the D2D UE releases the PC5 connection with the remote D2D UE, and the remote D2D UE reinitiates a D2D discovery/PC5 connection establishment process with the D2D UE.

Figure 13:
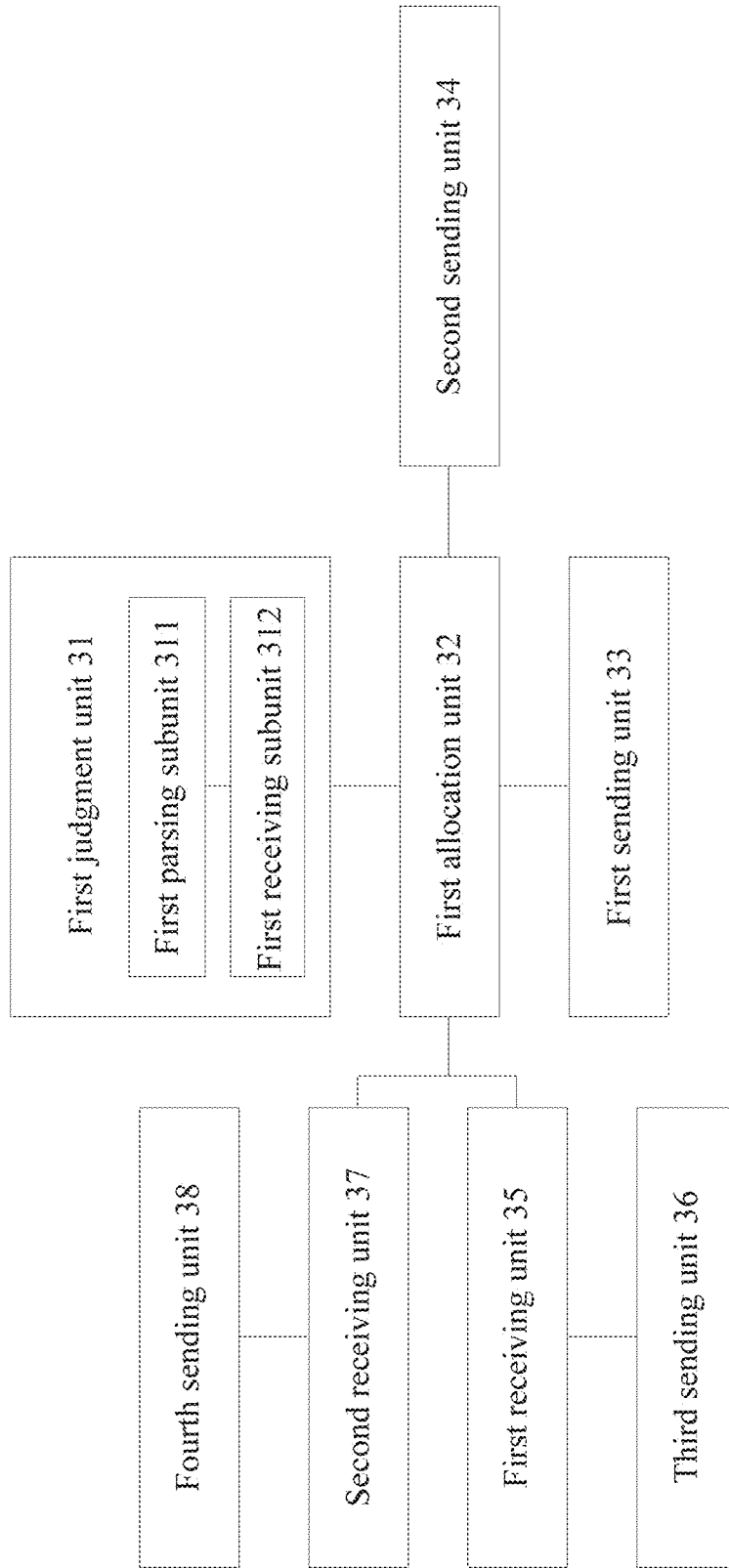
FIG. 13 is a structure diagram of D2D UE according to an embodiment of the disclosure.

FIG. 13 is a structure diagram of D2D UE according to an embodiment of the disclosure. As shown in FIG. 13, the D2D UE includes:

a first judgment unit 31, arranged to judge whether a terminal ID of the D2D UE conflicts with a terminal ID or D2D group ID of another D2D UE or not;

a first allocation unit 32, arranged to, when the terminal ID of the D2D UE conflicts with the terminal ID or D2D group ID of the other D2D UE, reallocate a terminal ID to the D2D UE; and a first sending unit 33, arranged to send thereallocated terminal ID of the D2D UE to second D2D UE, the second D2D UE being proximal D2D UE of the D2D UE or D2D UE which has established a PC5 connection with the D2D UE.

In the embodiment of the disclosure, the first judgment unit 31 includes:

a first parsing subunit 311, arranged to, when a received data packet fails to be parsed, determine that the terminal ID of the D2D UE conflicts with the terminal ID or D2D group ID of the other D2D UE; or, a first receiving subunit 312, arranged to, when ID conflict indication information sent from third D2D UE is received, determine that the terminal ID of the D2D UE conflicts with the terminal ID or D2D group ID of the other D2D UE, the ID conflict indication information being arranged to indicate that the terminal ID of the D2D UE conflicts with the terminal ID or D2D group ID of the other D2D UE.

In the embodiment of the disclosure, the first parsing subunit 311 is configured in a manner that, when a PDCP layer of the D2D UE fails to decrypt the received data packet, or, the D2D UE judges that a target IP address of the received data packet is inconsistent with its own IP address, or, an application layer of the D2D UE judges that the received data packet has an error, the received data packet fails to be parsed.

In the embodiment of the disclosure, the first receiving subunit 312 is arranged to receive the ID conflict indication information sent from the third D2D UE through a MAC CE of a unicast D2D communication physical channel, or, receive the ID conflict indication information sent from the third D2D UE through PC5 interface signaling, or, receive the ID conflict indication information sent from the third D2D UE through a unicast D2D communication data packet, or, receive the ID conflict indication information sent from the third D2D UE through a D2D discovery message.

In the embodiment of the disclosure, the D2D UE is remote D2D UE or relay D2D UE or D2D UE; the second D2D UE is remote D2D UE or relay D2D UE or D2D UE; and the third D2D UE is remote D2D UE or relay D2D UE or D2D UE.

In the embodiment of the disclosure, the first sending unit 33 is arranged to send at least one of an old terminal ID, a reallocated terminal ID, a connection release indication or an ID change indication of the D2D UE to the second D2D UE through a D2D discovery message, or, send at least one of the old terminal ID, the reallocated terminal ID, the connection release indication or the ID change indication of the D2D UE to the second D2D UE through a D2D communication MAC CE, or, send at least one of the old terminal ID, the reallocated terminal ID, the connection release indication or the ID change indication of the D2D UE to the second D2D UE through PC5 interface signaling, or, send at least one of the old terminal ID, the reallocated terminal ID, the connection release indication or the ID change indication of the D2D UE to the second D2D UE through a D2D communication data packet.

In the embodiment of the disclosure, the D2D UE further includes:

a second sending unit 34, arranged to send the reallocated terminal ID of the D2D UE to a base station which, upon reception of the reallocated terminal ID of the first D2D UE, stores the reallocated terminal ID and update the reallocated terminal ID into context information of the D2D UE.

In the embodiment of the disclosure, after receiving the reallocated terminal ID of the D2D UE, the second D2D UE starts using the reallocated terminal ID of the D2D UE as a target ID for sending D2D data to the D2D UE, and correspondingly, the D2D UE further includes:

a first receiving unit 35, arranged to receive a data packet using thereallocated terminal ID of the D2D UE as the target ID from the second D2D UE, and a third sending unit 36, arranged to use thereallocated terminal ID of the D2D UE as a source ID for sending D2D data to the second D2D UE;

or, after receiving the reallocated terminal ID of the D2D UE, the second D2D UE sends terminal ID reception confirmation information to the D2D UE through a D2D communication data packet, and the D2D UE further includes:

a second receiving unit 37, arranged to receive terminal ID confirmation information sent from the second D2D UE, and a fourth sending unit 38, arranged to use the reallocated terminal ID of the D2D UE as the source ID for sending the D2D data to the second D2D UE.

Those skilled in the art should know that functions realized by the units in the D2D UE shown in FIG. 13 may be understood with reference to related descriptions in the abovementioned D2D ID conflict resolution method.

Figure 14:
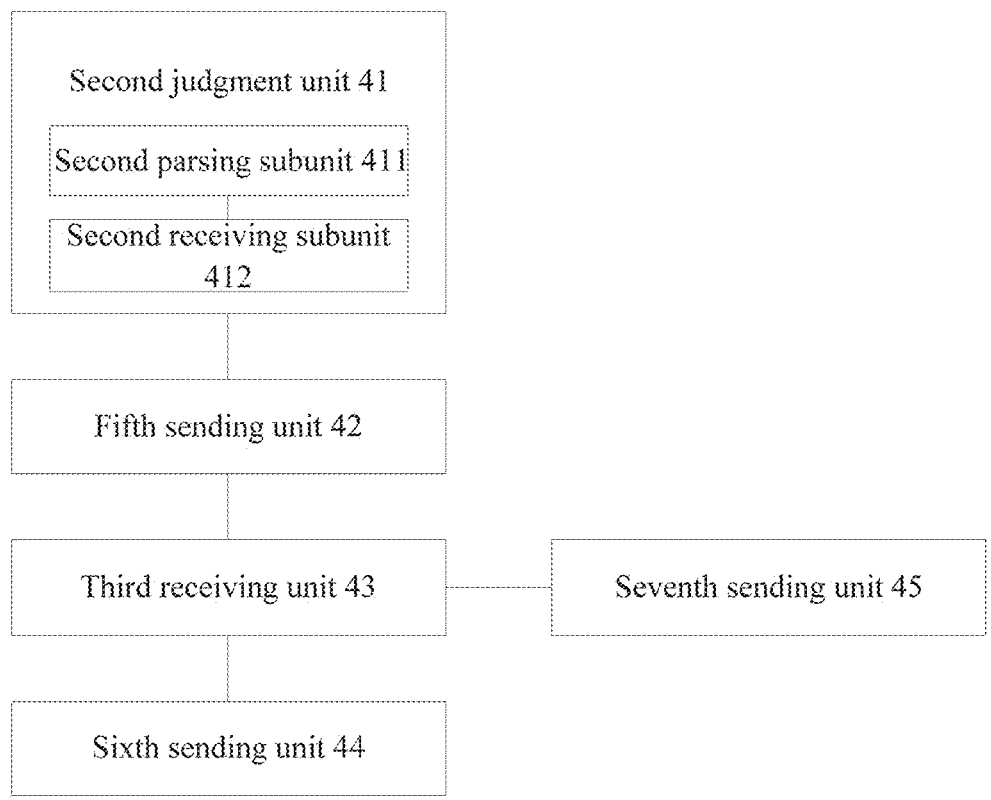
FIG. 14 is a structure diagram of D2D UE according to another embodiment of the disclosure.

FIG. 14 is a structure diagram of D2D UE according to another embodiment of the disclosure. As shown in FIG. 14, the D2D UE includes:

a second judgment unit 41, arranged to judge whether a terminal ID of the D2D UE conflicts with a terminal ID or D2D group ID of another D2D UE or not;

a fifth sending unit 42, arranged to, when the terminal ID of the D2D UE conflicts with the terminal ID or D2D group ID of the other D2D UE, send ID conflict indication information to fifth D2D UE, thereby causing the fifth D2D UE to reallocate a terminal ID to the D2D UE; and a third receiving unit 43, arranged to receive the terminal ID sent from the fifth D2D UE and reallocated to the D2D UE.

In the embodiment of the disclosure, the second judgment unit 41 includes:

a second parsing subunit 411, arranged to, when a received data packet fails to be parsed, determine that the terminal ID of the D2D UE conflicts with the terminal ID or D2D group ID of the other D2D UE; or, a second receiving subunit 412, arranged to, when the ID conflict indication information sent from sixth D2D UE is received, determine that the terminal ID of the D2D UE conflicts with the terminal ID or D2D group ID of the other D2D UE, the ID conflict indication information being arranged to indicate that the terminal ID of the D2D UE conflicts with the terminal ID or D2D group ID of the other D2D UE.

In the embodiment of the disclosure, the second receiving subunit 412 is arranged to receive the ID conflict indication information sent from the sixth D2D UE through a unicast D2D communication MAC CE, or, receive the ID conflict indication information sent from the sixth D2D UE through PC5 interface signaling, or, receive the ID conflict indication information sent from the sixth D2D UE through a unicast D2D communication data packet, or, receive the ID conflict indication information sent from the sixth D2D UE through a D2D discovery message.

In the embodiment of the disclosure, the fifth sending unit 42 is arranged to send an ID conflict indication to the fifth D2D UE through a unicast D2D communication MAC CE, or, send the ID conflict indication to the fifth D2D UE through PC5 interface signaling, or, send the ID conflict indication to the fifth D2D UE through a unicast D2D communication data packet, or, send the ID conflict indication to the fifth D2D UE through a D2D discovery message.

In the embodiment of the disclosure, the third receiving unit 43 is arranged to receive the terminal ID sent from the fifth D2D UE and reallocated to the D2D UE through a unicast D2D communication MAC CE, receive the terminal ID sent from the fifth D2D UE and reallocated to the D2D UE through PC5 interface signaling, or, receive the terminal ID sent from the fifth D2D UE and reallocated to the D2D UE through a unicast D2D communication data packet, or, receive the terminal ID sent from the fifth D2D UE and reallocated to the D2D UE through a D2D discovery message.

In the embodiment of the disclosure, the D2D UE further includes:

a sixth sending unit 44, arranged to send the reallocated terminal ID of the D2D UE to proximal D2D UE or D2D UE which has established a connection with the D2D UE.

In the embodiment of the disclosure, the D2D UE further includes:

a seventh sending unit 45, arranged to send the reallocated terminal ID of the D2D UE to a base station which, upon reception of the reallocated terminal ID of the D2D UE, stores the reallocated terminal ID and updates the relocated terminal ID into context information of the D2D UE.

In the embodiment of the disclosure, the D2D UE is remote D2D UE, and the fifth D2D UE is relay D2D UE.

Those skilled in the art should know that functions realized the units in the D2D UE shown in FIG. 14 may be understood with reference to related descriptions in the abovementioned D2D ID conflict resolution method.

An embodiment of the disclosure further provides a computer-readable storage medium, which stores a computer-executable instruction, the computer-executable instruction being executed by a processor to implement the abovementioned D2D ID conflict resolution method.

The technical solutions recorded by the embodiments of the disclosure may be freely combined without conflicts.

In some embodiments provided by the disclosure, it should be understood that the disclosed method and intelligent equipment may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, the function units in the embodiments of the disclosure may be integrated into another processing unit, each unit may also exist independently, and two or more than two unit may also be integrated into a unit. The integrated unit may be implemented in a hardware form, and may also be implemented in form of hardware and software function unit.

The above is only the implementation mode of the disclosure and not intended to limit the scope of protection of the application. Any variations or replacements apparent to those skilled in the art within the technical scope disclosed by the application shall fall within the scope of protection of the application.

INDUSTRIAL APPLICABILITY

According to the embodiments of the disclosure, D2D UE may timely detect a terminal ID conflict and reacquire a new terminal ID, smooth D2D communication is ensured. A conflict between terminal IDs of D2D UEs for D2D unicast communication or a conflict between a terminal ID for D2D unicast communication and a D2D group ID of a multicast communication group is avoided.

The invention claimed is:

1. A Device-to-Device (D2D) Identifier (ID) conflict resolution method, applied to a first D2D User Equipment (UE) and comprising:

judging whether a terminal ID of the first D2D UE conflicts with a terminal ID or a D2D group ID of another D2D UE;

when the terminal ID of the first D2D UE conflicts with the terminal ID or the D2D group ID of the another D2D UE, reallocating a terminal ID to the first D2D UE; and sending the reallocated terminal ID of the first D2D UE to a second D2D UE, wherein the second D2D UE is a D2D UE in proximity to the first D2D UE, or is a D2D UE which has established a PC5 connection with the first D2D UE;

wherein the judging whether the terminal ID of the first D2D UE conflicts with the terminal ID or the D2D group ID of the another D2D UE, comprises:

upon reception of ID conflict indication information sent from a third D2D UE, determining that the terminal ID of the first D2D UE conflicts with the terminal ID or the D2D group ID of the another D2D UE, wherein the ID conflict indication information is arranged to indicate that the terminal ID of the first D2D UE conflicts with the terminal ID or the D2D group ID of the another D2D UE.

2. The D2D ID conflict resolution method according to claim 1, wherein the receiving the ID conflict indication information sent from the third D2D UE, comprises:
receiving, through a Media Access Control (MAC) Control Element (CE) of a unicast D2D communication physical channel, the ID conflict indication information sent from the third D2D UE; or,
receiving, through a PC5 interface signaling, the ID conflict indication information sent from the third D2D UE; or,
receiving, through a unicast D2D communication data packet, the ID conflict indication information sent from the third D2D UE; or,
receiving, through a D2D discovery message, the ID conflict indication information sent from the third D2D UE.

3. The D2D ID conflict resolution method according to claim 1, wherein, before the ID conflict indication information sent from the third D2D UE is received, the third D2D UE detects that the terminal ID of the first D2D UE conflicts with the terminal ID or the D2D group ID of the another D2D UE.

4. The D2D ID conflict resolution method according to claim 1, wherein detecting, by the third D2D UE, that the terminal ID of the first D2D UE conflicts with the terminal ID or the D2D group ID of the another D2D UE, comprises:
detecting, by the third D2D UE through a received D2D discovery message sent from the first D2D UE, that the terminal ID of the first D2D UE is the same as the terminal ID or the D2D group ID of the another D2D UE; or,
detecting, by the third D2D UE through a received PC5 interface signaling sent from the first D2D UE, that the terminal ID of the first D2D UE is the same as the terminal ID or the D2D group ID of the another D2D UE; or,
detecting, by the third D2D UE through a MAC Protocol Data Unit (PDU) of a received data packet sent from the first D2D UE, that the terminal ID of the first D2D UE is the same as the terminal ID or the D2D group ID of the another D2D UE.

5. The D2D ID conflict resolution method according to claim 1, wherein
the first D2D UE is a remote D2D UE or a relay D2D UE or a D2D UE; the second D2D UE is a remote D2D UE or a relay D2D UE or a D2D UE; and the third D2D UE is a remote D2D UE or a relay D2D UE or a D2D UE.

6. The D2D ID conflict resolution method according to claim 1, wherein the sending the reallocated terminal ID of the first D2D UE to the second D2D UE, comprises:
sending, to the second D2D UE through a D2D discovery message, at least one of an old terminal ID, the reallocated terminal ID, a connection release indication or an ID change indication of the the first D2D UE; or,
sending, to the second D2D UE through a D2D communication MAC CE, at least one of the old terminal ID, the reallocated terminal ID, the connection release indication or the ID change indication of the first D2D UE; or,
sending, to the second D2D UE through a PC5 interface signaling, at least one of the old terminal ID, the reallocated terminal ID, the connection release indication or the ID change indication of the first D2D UE; or,
sending, to the second D2D UE through a D2D communication data packet, at least one of the old terminal ID, the reallocated terminal ID, the connection release indication or the ID change indication of the first D2D UE.

7. The D2D ID conflict resolution method according to claim 6, wherein, upon reception of at least one of the connection release indication or the ID change indication sent from the first D2D UE, the second D2D UE releases the PC5 connection with the first D2D UE.

8. The D2D ID conflict resolution method according to claim 1, wherein after the reallocating a terminal ID to the first D2D UE, the method further comprises:
sending the reallocated terminal ID of the first D2D UE to a base station which, upon reception of the allocated terminal ID of the first D2D UE, stores the reallocated terminal ID and updates the reallocated terminal ID into context information of the first D2D UE.

9. The D2D ID conflict resolution method according to claim 1, wherein
upon reception of the reallocated terminal ID of the first D2D UE, the second D2D UE starts using the reallocated terminal ID of the first D2D UE as a target ID for sending D2D data to the first D2D UE, and correspondingly,
the method further comprises: upon reception of a data packet, sent from the second D2D UE, with the reallocated terminal ID of the first D2D UE as the target ID, starting using the reallocated terminal ID of the first D2D UE as a source ID for sending D2D data to the second D2D UE;
or, wherein, upon reception of the reallocated terminal ID of the first D2D UE, the second D2D UE sends, through a D2D communication data packet, terminal ID reception confirmation information to the first D2D UE, and correspondingly,
the method further comprises: upon reception of the terminal ID reception confirmation information sent from the second D2D UE, starting using the reallocated terminal ID of the first D2D UE as the source ID for sending the D2D data to the second D2D UE.

10. The D2D ID conflict resolution method according to claim 1, wherein after the sending the reallocated terminal ID of the first D2D UE to the second D2D UE, the method further comprises:
starting using, by the first D2D UE and the second D2D UE, the reallocated terminal ID for data transmission after a current modification period, wherein the second D2D UE is a D2D UE which has established the PC5 connection with the first D2D UE, and the modification period is configured by the base station or a Proximity-based Service (ProSe) server or a network element of a core network.

11. A Device-to-Device (D2D) User Equipment (UE), comprising a processor; and one or more modules stored on a memory and executable by the processor, wherein the one or more modules comprises:
a first judgment unit, arranged to judge whether a terminal Identifier (ID) of a first D2D UE conflicts with a terminal ID or a D2D group ID of another D2D UE;
a first allocation unit, arranged to, when the terminal ID of the first D2D UE conflicts with the terminal ID or the D2D group ID of the another D2D UE, reallocate a terminal ID to the first D2D UE; and a first sending unit, arranged to send the reallocated terminal ID of the first D2D UE to a second D2D UE, wherein the second D2D UE is a D2D UE in proximity to the D2D UE or is a D2D UE which has established a PC5 connection with the D2D UE;

wherein the first judgment unit is further arraged to:

upon reception of ID conflict indication information sent from a third D2D UE, determine that the terminal ID of the D2D UE conflicts with the terminal ID or the D2D group ID of the another D2D UE, wherein the ID conflict indication information is arranged to indicate that the terminal ID of the D2D UE conflicts with the terminal ID or the D2D group ID of the another D2D UE.

12. A Device-to-Device (D2D) User Equipment (UE), comprising a processor; and a memory for storing instructions executable by the processor, wherein the processor is arranged to:

judge whether a terminal Identifier (ID) of a first D2D UE conflicts with a terminal ID or D2D group ID of another D2D UE;

when the terminal ID of the first D2D UE conflicts with the terminal ID or the D2D group ID of the another D2D UE, send ID conflict indication information to a second D2D UE, thereby causing the second D2D UE to reallocate a terminal ID to the first D2D UE; and receive the terminal ID sent from the second D2D UE and reallocated to the first D2D UE;

wherein the processor is further arraged to:

upon reception of ID conflict indication information sent from a third D2D UE, determine that the terminal ID of the first D2D UE conflicts with the terminal ID or the D2D group ID of the another D2D UE, wherein the ID conflict indication information is arranged to indicate that the terminal ID of the first D2D UE conflicts with the terminal ID or the D2D group ID of the another D2D UE.

* * * * *